US008940801B2

(12) United States Patent
Bentley et al.

(10) Patent No.: US 8,940,801 B2
(45) Date of Patent: *Jan. 27, 2015

(54) HETEROBIFUNCTIONAL POLY(ETHYLENE GLYCOL) DERIVATIVES AND METHODS FOR THEIR PREPARATION

(75) Inventors: Michael D. Bentley, Huntsville, AL (US); J. Milton Harris, Huntsville, AL (US); Antoni Kozlowski, Huntsville, AL (US)

(73) Assignee: Nektar Therapeutics, San Francisco, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 12/620,011

(22) Filed: Nov. 17, 2009

(65) Prior Publication Data

US 2010/0063328 A1 Mar. 11, 2010

Related U.S. Application Data

(60) Continuation of application No. 11/016,383, filed on Dec. 17, 2004, now Pat. No. 7,642,323, which is a continuation-in-part of application No. 10/071,469, filed on Feb. 8, 2002, now Pat. No. 6,864,327, which is a division of application No. 09/186,759, filed on Nov. 5, 1998, now Pat. No. 6,448,369.

(60) Provisional application No. 60/064,600, filed on Nov. 6, 1997.

(51) Int. Cl.
*C08G 65/332* (2006.01)
*C08G 65/329* (2006.01)
*C07C 41/01* (2006.01)

(52) U.S. Cl.
CPC .................................. *C08G 65/329* (2013.01)
USPC ........... 516/204; 525/403; 525/409; 562/579; 562/580

(58) Field of Classification Search
USPC ............ 516/204; 525/403, 409; 562/579, 580
See application file for complete search history.

(56) References Cited

U.S. PATENT DOCUMENTS

| | | | |
|---|---|---|---|
| 2,688,604 A | 9/1954 | Suen | |
| 2,860,980 A | 11/1958 | Milton | |
| 2,876,263 A | 3/1959 | Mark et al. | |
| 2,996,550 A | 8/1961 | Simons | |
| 3,123,640 A | 3/1964 | Langley | |
| 3,309,340 A | 3/1967 | Borman | |
| 3,539,605 A | 11/1970 | Oberhofer et al. | |
| 3,896,040 A * | 7/1975 | Danesh ..................... | 510/276 |
| 4,011,313 A | 3/1977 | Thompson | |
| 4,179,337 A | 12/1979 | Davis et al. | |
| 4,588,840 A | 5/1986 | Gurgiolo | |
| 4,606,837 A | 8/1986 | McEntire et al. | |
| 4,670,417 A * | 6/1987 | Iwasaki et al. ............. | 514/832 |
| 4,722,978 A | 2/1988 | Yu | |
| 4,761,502 A | 8/1988 | Kluger et al. | |
| 4,922,029 A | 5/1990 | Bimbach et al. | |
| 4,943,626 A | 7/1990 | McGrath et al. | |
| 5,122,614 A | 6/1992 | Zalipsky | |
| 5,252,714 A | 10/1993 | Harris et al. | |
| 5,298,410 A | 3/1994 | Phillips et al. | |
| 5,298,643 A | 3/1994 | Greenwald | |
| 5,321,095 A | 6/1994 | Greenwald | |
| 5,334,371 A * | 8/1994 | Gries et al. .................... | 514/836 |
| 5,349,001 A | 9/1994 | Greenwald | |
| 5,364,909 A | 11/1994 | Guo et al. | |
| 5,532,150 A | 7/1996 | Snow et al. | |
| 5,605,976 A | 2/1997 | Martinez et al. | |
| 5,661,122 A | 8/1997 | Clark et al. | |
| 5,681,567 A * | 10/1997 | Martinez et al. ........... | 424/178.1 |
| 5,747,639 A | 5/1998 | Seely et al. | |
| 5,990,237 A | 11/1999 | Bentley et al. | |
| 6,071,988 A | 6/2000 | Barbee et al. | |
| 6,362,254 B2 | 3/2002 | Harris et al. | |
| 6,437,025 B1 | 8/2002 | Harris et al. | |
| 6,448,369 B1 | 9/2002 | Bentley et al. | |
| 6,495,659 B2 | 12/2002 | Bentley et al. | |
| 6,815,530 B2 | 11/2004 | Ekwuribe et al. | |
| 6,835,802 B2 | 12/2004 | Ekwuribe et al. | |
| 6,858,580 B2 | 2/2005 | Ekwuribe et al. | |
| 6,864,327 B2 | 3/2005 | Bentley et al. | |

(Continued)

FOREIGN PATENT DOCUMENTS

| | | | |
|---|---|---|---|
| EP | 174675 A | * | 3/1986 |
| EP | 0 867 190 | | 9/1998 |

(Continued)

OTHER PUBLICATIONS

Derwent Abstract on East, week 199033, London: Derwent Publications Ltd., AN 1990-249821, JP 02173107 A, (Denka Int BV), abstract.*
JPO on East, Patent Abstracts of Japan, Japan patent Office, Tokyo, Japan, JP 02173107 A (Jul. 1990), Abstract.*
JPO on East, Patent Abstracts of Japan, Japan patent Office, Tokyo, Japan, JP 06135889 A (May 1994), Abstract.*
Machine Translation of Publ. No. JP H06-135889, published May 1994, Japan patent Office, Tokyo, Japan, obtained online @ http://dossier1.ipdl.inpit.go.jp/AIPN/odse_top_dn.ipdl?N0000=7400 (Downloaded Jun. 8, 2012), pp. 1-12.*
JPO on East, Patent Abstracts of Japan, Japan patent Office, Tokyo, Japan, JP 06136014 A (May 1994), Abstract.*

(Continued)

*Primary Examiner* — Daniel S Metzmaier
(74) *Attorney, Agent, or Firm* — Mark A. Wilson

(57) ABSTRACT

This invention provides a method related to the preparation of derivatives of poly(ethylene glycol), wherein the method comprises increasing the pH of an aqueous composition comprising a poly(ethylene glycol) bearing a —O—$(CH_2)_n$—$CO_2R_3$ functional group to result in an aqueous composition comprising a poly(ethylene glycol) bearing a —O—$(CH_2)_n$—$CO_2H$ functional group, wherein $R_3$ is alkyl and (n) in each instance is 1-6.

8 Claims, No Drawings

(56) References Cited

U.S. PATENT DOCUMENTS

| | | |
|---|---|---|
| 7,642,323 B2 | 1/2010 | Bentley et al. |
| 2002/0072573 A1 | 6/2002 | Bentley et al. |
| 2003/0114533 A1 | 6/2003 | Raab et al. |
| 2005/0176896 A1 | 8/2005 | Bentley et al. |

FOREIGN PATENT DOCUMENTS

| | | | |
|---|---|---|---|
| JP | 60028429 | | 2/1985 |
| JP | 02-173107 A | * | 7/1990 |
| JP | 06-135889 A | * | 5/1994 |
| JP | 06-136014 A | * | 5/1994 |
| JP | 07048450 | | 2/1995 |
| JP | 07300521 | | 11/1995 |
| JP | 07316285 | | 12/1995 |
| JP | 08092366 | | 4/1996 |
| WO | 96/35451 | | 11/1996 |
| WO | 97/03106 | | 1/1997 |
| WO | 99/14259 | | 3/1999 |
| WO | 99/34833 | | 7/1999 |
| WO | 99/45964 | | 9/1999 |
| WO | 01/87818 | | 11/2001 |

OTHER PUBLICATIONS

Machine Translation of Publ. No. JP H06-136014, published May 1994, Japan patent Office, Tokyo, Japan, obtained online @ http://dossier1.ipdl.inpit.go.jp/AIPN/odse_top_dn.ipdl?N0000=7400 (Downloaded Jun. 8, 2012), pp. 1-18.*

Bentley, et al., "Peg-Linked Artemisinin Antimalarials", Polymer Preprints, vol. 38, No. 1, pp. 584-585, (1997).

Cammas, et al., "Heterobifunctional Poly(ethylene oxide): Synthesis of Alpha-Methoxy-Omega-amino and Alpha-Hydroxy-Omega-amino PEOs with the Same Molecular Weights", Bioconjugate Chem., vol. 6, pp. 226-230, (1995).

Dust, et al., "Proton NMR Characterization of Poly(ethylene glycols) and Derivatives", Macromolecules, vol. 23, No. 16, pp. 3742-3746, (1990).

Harris, Poly(Ethylene Glycol) Chemistry, Plenum Publishing Corp., pp. 347-369, 376-381, (1992).

Nagasaki, et al., "Formyl-Ended Heterobifunctional Poly(ethylene oxide): Synthesis of Poly(ethylene oxide) with a Formyl Group at One End and a Hydroxyl Group at the Other End", Bioconjugate Chem., vol. 6, pp. 231-233, (1995).

Yokoyama, et al., "Synthesis of Poly(ethylene oxide) with Heterobifunctional Reactive Groups as its Terminals by an Anionic Initiator", Bioconjugate Chem., vol. 3, pp. 275-276, (1992).

Zalipsky, "Synthesis of an End-Group Functionalized Polyethylene Glycol-Lipid Conjugate for Preparation of Polymer-Grafted Liposomes", Bioconjugate Chem., vol. 4, pp. 296-299, (1993).

Zhao, et al., "Novel Degradable Poly(Ethylene Glycol) Hydrogels for Controlled Release of Protein", J. of Pharm. Sci. US, American Pharm. Assoc., WA., vol. 87, No. 11, pp. 1450-1458, (Nov. 1, 1998).

Enzon Pharmaceuticals, Macromolecular Engineering Technologies, pp. 1-14, (2004).

Nektar—Transforming Therapeutics, Nektar Molecule Engineering: Polyethylene Glycol and Derivatives for Advanced PEGylation, pp. 1-20, (Catalog—2003).

Nektar—Transforming Therapeutics, Nektar Advanced PEGylation: Polyethylene Glycol and Derivatives for Advanced PEGylation, pp. 1-24 (Catalog—2004).

NOF Corporation, "PEG Derivatives, Phospholipid and Drug Delivery Materials for Pharmaceuticals", pp. 1-46, (Catalogue 2003—1st).

NOF Corporation, "PEG Derivatives, Phospholipid and Drug Delivery Materials for Pharmaceuticals", pp. 1-50, (Catalogue 2003—2nd).

Polypure, Products; PEG amines; PEG acids and amino acids; PEG thiols and disulfides; BIOTINS, (Apr. 2004).

Quanta Biodesign, Labeling, Derivatization and Crosslinking Reagents for Biological and Related Materials with dPEG, pp. 1-38, (Mar. 12, 2004).

Quanta Biodesign, Labeling, Modification and Crosslinking Reagents incorporating our unique monodispersed dPEG Technology, pp. 1-31, (Nov. 5, 2004).

Shearwater Polymers, Inc., pp. 2-49, (Catalog—Mar. 1995).

Shearwater Polymers, Inc., Polyethylene Glycol and Derivatives, pp. 1-53, (Catalog—Jul. 1997).

Shearwater Polymers Inc., Polyethylene Glycol anti Derivatives: Functionalized Biocompatible Polymers for Research and Pharmaceuticals, pp. 1-50, (Catalog—2000).

Shearwater Corporation, Polyethylene Glycol and Derivatives for Biomedical Applications, pp. 1-17, (Catalog—2001).

European Communication in European Patent Application No. 99 951 885.5 dated Dec. 15, 2005.

European Communication in European Patent Application No. 99 951 885.5 dated Aug. 17, 2007.

PCT International Search Report in PCT Patent Application No. PCT/US1999/023536 date of mailing Jun. 5, 2000.

PCT Written Opinion in PCT Patent Application No. PCT/US1999/023536 date of mailing Jul. 26, 2001.

PCT International Preliminary Examination Report in PCT Patent Application No. PCT/US1999/023536 date of mailing Jan. 11, 2002.

Communication dated Sep. 22, 2008 corresponding to European Patent Application No. 99 951 885.5-2404.

Communication dated Feb. 17, 2010 corresponding to European Patent Application No. 99 951 885.5-2404.

Communication dated Mar. 21, 2011 corresponding to European Patent Application No. 99 951 885.5-2404.

* cited by examiner

HETEROBIFUNCTIONAL POLY(ETHYLENE GLYCOL) DERIVATIVES AND METHODS FOR THEIR PREPARATION

CROSS-REFERENCE TO RELATED APPLICATIONS

This application is a continuation of U.S. patent application Ser. No. 11/016,383, filed Dec. 17, 2004, now U.S. Pat. No. 7,642,323 which is a continuation-in-part of U.S. patent application Ser. No. 10/071,469, filed Feb. 8, 2002, now U.S. Pat. No. 6,864,327, which is a divisional of U.S. patent application Ser. No. 09/186,759, filed Nov. 5, 1998, now U.S. Pat. No. 6,448,369, which claims the benefit of priority of U.S. Provisional Patent Application Ser. No. 60/064,600, filed Nov. 6, 1997, all of which are incorporated herein by reference in their entirety.

FIELD OF THE INVENTION

The invention relates to heterobifunctional poly(ethylene glycol) derivatives and methods for their preparation.

BACKGROUND OF THE INVENTION

Covalent attachment of the hydrophilic polymer poly(ethylene glycol), abbreviated (PEG), also known as poly(ethylene oxide), abbreviated (PEO), to molecules and surfaces has important applications in biotechnology and medicine. In its most common form, PEG is a linear polymer having hydroxyl groups at each terminus:

$$HO-CH_2-CH_2O(CH_2CH_2O)_nCH_2CH_2-OH$$

This formula can be represented in brief as HO-PEG-OH, where it is understood that -PEG- represents the polymer backbone without its terminal groups:

$$-PEG- \text{ equals } -CH_2CH_2O(CH_2CH_2O)_nCH_2CH_2-$$

PEG is commonly used as methoxy-PEG-OH, or mPEG in brief, in which one terminus is the relatively inert methoxy group, while the other terminus is a hydroxyl group that is subject to ready chemical modification.

$$CH_3O-(CH_2CH_2O)_n-CH_2CH_2-OH.$$

The term poly(ethylene glycol) or PEG represents or includes all of the herein described forms of PEG and still others.

The copolymers of ethylene oxide and propylene oxide are closely related to PEG in their chemistry, and they can be substituted for PEG in many of its applications.

$$HO-CH_2CHRO(CH_2CHRO)_nCH_2CHR-OH$$

R=H and CH₃

PEG is a useful polymer having the property of water solubility as well as solubility in many organic solvents. PEG is also non-toxic and non-immunogenic. When PEG is chemically attached to a water insoluble compound, the resulting conjugate generally is water soluble as well as soluble in many organic solvents. When the molecule to which PEG is attached is biologically active, such as a drug, this activity is commonly retained after attachment of PEG and the conjugate may display altered pharmacokinetics. For example, Bentley et al. in *Polymer Preprints,* 38(1), 584 (1997) demonstrated that the water insoluble antemisinin becomes water soluble and exhibits increased antimalarial activity when coupled to PEG. Davis et al., in U.S. Pat. No. 4,179,337 have shown that proteins coupled to PEG have enhanced blood circulation lifetime because of reduced kidney clearance and reduced immunogenicity. The lack of toxicity of PEG and its rapid clearance from the body are advantageous for pharmaceutical applications.

As applications of PEG chemistry have become more sophisticated, there has been an increasing need for heterobifunctional PEGs, that is PEGs bearing dissimilar terminal groups:

X-PEG-Y where X and Y are typically different functional groups. PEGs having, for example, a backbone ester group, that is to say, having an ester function interposed between polyethylene glycol polymer segments, as well as the terminal groups, X and Y:

X-PEG-CO₂-PEG-Y is considered to be heterobifunctional even if X and Y are the same, since each PEG segment within the overall polymer backbone is substituted in an unsymmetrical fashion.

Such heterobifunctional PEGs bearing appropriate functional groups are used to link the PEGs to surfaces or other polymers, such as polysaccharides or proteins, with the other terminus attached, for example, to a drug, a liposome, a targeting agent, a label, another protein, or a biosensor. If one terminus is bound to a polymer, and the other terminus is bonded to an appropriate functional group, cross-linking to form a hydrogel can occur.

Utilizing existing methods, however, heterobifunctional PEGs are often difficult or impossible to prepare in high purity. For example, one could conduct the reaction below, using molar equivalents of each reagent with the goal of preparing the heterobifunctional PEG acetal product shown:

$$HO\text{-PEG-OH}+ClCH_2CH(OC_2H_5)_2+NaOH \rightarrow$$

$$\rightarrow HO\text{-PEG-}OCH_2CH(OC_2H_5)_2+NaCl+H_2O$$

In practice, however, some of the disubstututed PEG diethyl acetal, $(C_2H_5O)_2CH_2O\text{-PEG-}OCH_2CH(OC_2H_5)_2$ is also inevitably formed and some unreacted PEG also remains in the reaction mixture. Tedious chromatography is then required to separate this mixture of PEG components.

Such a chromatographic approach has been used by Zalipsky (Bioconjugate Chemistry, 4: 296-299, 1993) to purify the following heterobifunctional PEG derivative:

HO-PEG-C(O)NHCH₂CO₂H from a reaction product mixture also containing unreacted PEG and the corresponding disubstituted carboxylic acid derivative.

In certain applications, it is important that a minimal amount of HO-PEG-OH is present in the end-capped, monoalkyl PEGs used to prepare monofunctional activated PEGs, since the presence of HO-PEG-OH often leads to doubly activated PEG derivatives which can result in crosslinked products, or have other undesirable effects. In fact, HO-PEG-OH is a common contaminant in monoalkyl PEGs such as monomethoxy-PEG. U.S. Pat. No. 5,298,410 describes a chromatographic separation of CH₃O-PEG-OH from HO-PEG-OH by forming the trityl (Ph₃C—) derivatives, separating the derivatives chromatographically, and then removing the trityl group from CH₃O-PEG-OCPh₃. International Patent Publication, WO96/35451 (Suzawa, et al.) describes benzyl PEG (C₆H₅—CH₂—O-PEG-OH) as an intermediate in preparing a heterobifunctional PEG bearing a group at one terminus having affinity for a target cell and having a toxin at the other terminus. The benzyl PEG, however, was prepared by benzylation of PEG, followed by laborious and extensive gradient chromatography to separate benzyl PEG from dibenzyl PEG and unreacted PEG. The procedure was carried out on a small scale with a yield of only 7.8%. The method thus has little value in useful commercial production applications.

A second strategy, the polymerization approach, for preparing heterobifunctional PEGs involves anionic polymerization of ethylene oxide onto an anion, $X^-$, which ultimately becomes the end-group of the polymer:

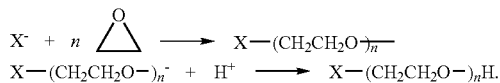

This method has been used by Yokoyama, et al. (Bioconjugate Chemistry, 3: 275-276, 1992) to prepare a PEG with a hydroxyl group at one terminus and an amino group at the other. Cammas, et al. (Bioconjugate Chemistry, 6: 226-230, 1995) used this method to prepare PEGs with an amino group on one terminus and a hydroxyl or methoxy group on the other. This method has also been used by Nagasaki, et al. (Biocojugate Chemistry, 6: 231-233, 1995) to prepare a PEG having a formyl group at one terminus and a hydroxyl group at the other. This method is generally useful only if X is a group suitable upon which to initiate polymerization; frequently this is not the case. Also, successful application of this method requires rigorous exclusion of water to prevent formation of HO-PEG-OH; this problem becomes more severe with increasing molecular weight of the polymer. It is also necessary to carefully control the degree of polymerization in order to obtain the desired molecular weight of the PEG derivative. This method is further limited by the potential for degradation of many types of drug molecules under the harsh conditions of the polymerization reaction if the ethylene oxide polymerization is conducted directly on the drug molecule. The method is also hampered by a lack of selectivity if more than one functional group is present on which polymerization can occur.

Thus, there is a need to provide additional and improved methods for preparing heterobifunctional PEGs that substantially eliminate at least some of the problems and drawbacks of the above-noted methods.

SUMMARY OF THE INVENTION

The present invention provides a method for preparing poly(ethylene glycol) derivatives via a PEG intermediate bearing a removable group at one terminus. PEG derivatives of the class, W-PEG-OH, where W is a group removable by mild chemical methods, are provided and are first altered by modifying the —OH group to a desired group, X, followed by removal of W to generate a second hydroxyl group. The latter hydroxyl group may then be further altered to a second functional group Y, thus providing the desired heterobifunctional PEG:

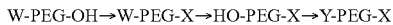

A preferred removable group is the benzyloxy group ($C_6H_5CH_2$—O—), although other arylmethyl groups including, but not limited to, 4-methylbenzyl, 3-methylbenzyl, 4-chlorobenzyl, 4-methoxybenzyl, diphenylmethyl, triphenylmethyl, or 1-naphthylmethyl, may be used. Diarylmethyl and triarylmethyl groups will also suffice. Benzyloxy-PEG-OH (BzO-PEG-OH), for example, may be prepared in high purity by polymerization of ethylene oxide onto the benzyloxide ion, $BzO^-$. By conducting the reaction under carefully controlled, anhydrous conditions, a heterobifunctional derivative product can be prepared with a minimum amount, e.g., less than 5 mol % of HO-PEG-OH. An advantage of benzyl and other arylmethyl groups is that they may be removed from the PEG under relatively mild conditions by catalytic hydrogenolysis or by acid-catalyzed hydrolysis. An illustrative reaction scheme is provided below:

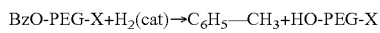

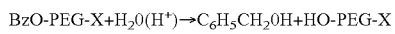

In the reactions above, cat is a catalyst such as palladium on charcoal.

Thus, the invention provides an approach for essentially removing PEG-diol from functionalized PEG or PEG-conjugate compositions. Rather than utilizing a traditional approach and removing PEG-diol impurity or its functionalized by-products, e.g., by chromatography, the Applicants have instead taken advantage of a series of chemical modifications to transform the PEG-diol into an inert, that is to say, unreactive, species.

In one embodiment of the invention, the method is used to prepare PEG derivatives or related polymers for conjugation to macromolecules such as proteins, drugs, lipids, polysaccharides, or other polymers or surfaces, where the PEG derivative employed is essentially free of any PEG-diol impurity. A benzyloxy-terminated polymer, e.g., BzO-PEG-OH, is first prepared or obtained. The hydroxyl group of the intermediate polymer BzO-PEG-OH, where PEG=—$(CH_2CH_2O)_n$-$CH_2CH_2$, is converted to a first reactive functional group, such as one suitable for attachment to an active entity such as a macromolecule. The benzyl group is then removed by hydrogenolysis or hydrolysis under conditions that do not alter the macromolecule in an adverse manner, to provide the corresponding hydroxy-terminated PEG. This new hydroxyl group may be used directly to attach that terminus of the PEG derivative to the same or another macromolecule. Alternatively, the hydroxyl group may be further converted to a second reactive functional group, which is then used to link the PEG derivative to a macromolecule. If the second reactive functional group is linked to another polymer, a cross-linked polymer useful as a hydrogel may be generated. The reaction scheme may be illustrated in a general form as follows:

 (1)

(X=reactive functional group)

 (2)

($M_1$=a macromolecule, e.g., surface, drug, protein, or polymer.)

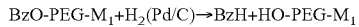

OR

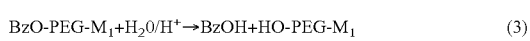 (3)

 (4)

($M_2$=a macromolecule, e.g., surface, drug, protein, or polymer, or a different site on $M_1$.)

If desired, the order of the reaction sequence can be manipulated to avoid destruction of a chemical group sensitive to hydrogenation or hydrolysis:

 (1)

 (2)

($M_2$=drug, surface, polymer, or other group not sensitive to hydrogenation or hydrolysis.)

$$BzO\text{-}PEG\text{-}M_2 + H_2(Pd/C) \rightarrow BzH(\text{or } BzOH) + HO\text{-}PEG\text{-}M_2$$

OR $$BzO\text{-}PEG\text{-}M_2 + H_2O/H+ \rightarrow BzH(\text{or } BzOH) + HO\text{-}PEG\text{-}M_2 \quad (3)$$

$$HO\text{-}PEG\text{-}M_2 \rightarrow M_1\text{-}PEG\text{-}M_2 \quad (4)$$

($M_1$=drug, surface, polymer, or other group sensitive to hydrogenation or hydrolysis.)

In another embodiment of the invention, a method of inhibiting the reactivity of HO-PEG-OH in a mixture of W—O-PEG-OH and HO-PEG-OH is disclosed. In this approach, alkylation of W—O-PEG-OH containing HO-PEG-OH produces a mixture of W—O-PEG-OR and RO-PEG-OR, where R is an alkyl group.

$$BzO\text{-}PEG\text{-}OH + HO\text{-}PEG\text{-}OH + R\text{—}X \rightarrow BzO\text{-}PEG\text{-}OR + RO\text{-}PEG\text{-}OR + HX$$

X is a leaving group such as mesylate or tosylate.
Catalytic hydrogenation converts the BzO-PEG-OR to RO-PEG-OH.

$$BzO\text{-}PEG\text{-}OR + RO\text{-}PEG\text{-}OR + H_2(Pd/C) \rightarrow RO\text{-}PEG\text{-}OH + RO\text{-}PEG\text{-}OR + BzH$$

Thus, a mixture of RO-PEG-OH and RO-PEG-OR is produced.
Unlike HO-PEG-OH, RO-PEG-OR is inert and nonreactive. Thus, the mixture is equivalent to a pure product of RO-PEG-OH in most chemical reactions.

The foregoing and other objects, advantages, and features of the invention, and the manner in which the same are accomplished, will be more readily apparent upon consideration of the following detailed description of the invention.

DETAILED DESCRIPTION OF THE INVENTION

This invention provides a method for preparing, in high purity and high yield, heterobifunctional derivatives of poly (ethylene glycol) or related polymers. A chromatographic purification step is not necessary in the method. In accordance with the method of the invention, an intermediate polymer having a formula of W-Poly-OH is provided bearing a removable group W at one terminus. The intermediate polymer W-Poly-OH is first altered by modifying the OH group to a first functional group X, followed by the removal of W to generate a second hydroxyl group. The latter hydroxyl group may then be further converted to a second functional group Y, thus providing the desired heterobifunctional derivative:

$$W\text{-}Poly\text{-}OH \rightarrow W\text{-}Poly\text{-}X \rightarrow HO\text{-}Poly\text{-}X \rightarrow Y\text{-}Poly\text{-}X$$

In the discussion below, Poly will often be referred to for convenience as PEG or as poly(ethylene glycol). However, it should be understood that other related polymers are also suitable for use in the practice of the invention and that the use of the term PEG or poly(ethylene glycol) is intended to be inclusive and not exclusive in this respect.

Poly(ethylene glycol) or PEG is useful in biological applications because it has properties that are highly desirable and is generally approved for biological or biotechnical applications. PEG typically is clear, colorless, odorless, soluble in water, stable to heat, inert to many chemical agents, does not hydrolyze or deteriorate, and is nontoxic. Poly(ethylene glycol) is considered to be biocompatible, which is to say that PEG is capable of coexistence with living tissues or organisms without causing harm. More specifically, PEG is not immunogenic, which is to say that PEG does not tend to produce an immune response in the body. When attached to a moiety having some desirable function in the body, the PEG tends to mask the moiety and can reduce or eliminate any immune response so that an organism can tolerate the presence of the moiety. Accordingly, the heterobifunctional derivative of the invention should be substantially non-toxic and should not tend substantially to produce an immune response or cause clotting or other undesirable effects.

PEG having the formula —$CH_2CH_2O$—$(CH_2CH_2O)_n$—$CH_2CH_2$—, where n is from about 8 to about 4000, is one useful polymer in the practice of the invention. Other difunctional, water soluble, nonpeptidic polymers than PEG are also suitable for the present invention. These other polymers include poly(vinyl alcohol) ("PVA"); other poly(alkylene oxides) such as poly(propylene glycol) ("PPG") and the like; and poly(oxyethylated polyols) such as poly(oxyethylated glycerol), poly(oxyethylated sorbitol), and poly(oxyethylated glucose), and the like. The polymers can be homopolymers or random or block copolymers and terpolymers based on the monomers of the above polymers, straight chain or branched.

Specific examples of suitable additional polymers include poly(oxazoline), difunctional poly(acryloylmorpholine) ("PAcM"), and poly(vinylpyrrolidone)("PVP"). PVP and poly(oxazoline) are well known polymers in the art and their preparation should be readily apparent to the skilled artisan. PAcM and its synthesis and use are described in U.S. Pat. Nos. 5,629,384 and 5,631,322, the contents of which are incorporated herein by reference in their entirety.

The terms "group," "functional group," "moiety," "active moiety," and "reactive site," are all somewhat synonymous in the chemical arts and are used in the art and herein to refer to distinct, definable portions or units of a molecule and to units that perform some function or activity and are reactive with other molecules or portions of molecules.

The term "linkage" is used to refer to groups that normally are formed as the result of a chemical reaction and typically are covalent linkages.

It should be understood that by "drug" is meant any substance intended for the diagnosis, cure, mitigation, treatment, or prevention of disease in humans and other animals, or to otherwise enhance physical or mental well being.

The term "macromolecule" is used to mean large molecules including, but not limited to, lipid, polysaccharide, proteins, nucleotide sequences, drugs, polymers, etc. It is often desirable to conjugate the above described polymers to such macromolecules.

In accordance with the invention, the removable group W can be removed from the polymer W-Poly-X by mild chemical reactions. Such chemical reactions can be performed in conditions under which other moieties of the polymer W-Poly-X, particularly the first functional group X, are not undesirably modified. Preferably W has a formula of Ar—C($R_1$)($R_2$)—O— where Ar represents a moiety selected from the group consisting of phenyl, substituted phenyl, biphenyl, substituted biphenyl, polycyclic aryls, substituted polycyclic aryls, and heterocyclic aryls, where $R_1$ and $R_2$ are H, alkyl, or Ar which is defined above. Thus, exemplary examples of the removable group W include, but are not limited to, benzyloxy group ($C_6H_5CH_2$—O—), and other arylmethyloxy groups including, but not limited to, 4-methylbenzyloxy, 3-methylbenzyloxy, 4-chlorobenzyloxy, 4-methoxybenzyloxy, diphenylmethyloxy, triphenylmethyloxy, and 1-naphthylmethyloxy. The arylmethyloxy groups can be removed from the polymer under relatively mild conditions by catalytic hydrogenolysis or acid-catalyzed hydrolysis.

In accordance with the invention, the intermediate polymer of W-Poly-OH is preferably synthesized, e.g., by polymerization of monomers of the suitable polymers onto the arylmethyloxide ion. For example, Benzyloxy-PEG-OH (BzO-PEG-OH) may be prepared in high purity and high yield by polymerization of ethylene oxide onto the benzyloxide ion BzO—. Preferably, the polymerization reaction is conducted under anhydrous conditions. In accordance with this aspect of the invention, production of HO-PEG-OH is minimized. Extensive gradient chromatography purification is not required, and the yield of BzO-PEG-OH is high. This is in contrast with the prior art method of benzylation of PEG followed by laborious extensive gradient chromatography, which inevitably leads to high cost and low yield rendering the method of little value for commercial production.

In accordance with the invention, the final product of the heterobifunctional derivative of poly(ethylene glycol) or related polymers have a formula of Y-Poly-X. The first functional group X and the second functional group Y are reactive moieties that are capable of reacting with other molecules to which the PEG derivatives are desired to be conjugated to, e.g., macromolecules including, but not limited to, proteins, lipids, polysaccharides, and other polymers. Examples of the first functional group X include, but are not limited to, mesylate; tosylate; tresylate; —O—$(CH_2)_n$—$CO_2H$ where n=1-6; —O—$(CH_2)_n$—$CO_2R_3$ where n=1-6 and $R_3$ is an alkyl group; —$NHR_4$ where $R_4$ is H or alkyl or an amine protecting group such as t-Boc and Fmoc; —O—$(CH_2)_n$—$CH(ZR_5)_2$ where n is a number of 1-6, Z is O or S, $R_5$ is H or an alkyl group; Ar—CH=CH—CH=CH—$CO_2$— where Ar represents a moiety selected from the group consisting of phenyl, substituted phenyl, biphenyl, substituted biphenyl, polycyclic aryls, substituted polycyclic aryls, and heterocyclic aryls; —O—$(CH_2)_n$—CHO; and —$O_2CCH_2CH_2CO_2R_6$, where $R_6$ is H or NHS which represents N-succinimidyl.

Examples of the second functional group Y include, but are not limited to, hydroxyl group; mesylate; tosylate; tresylate; —O—$(CH_2)_n$—$CO_2H$ where n=1-6; —O—$(CH_2)_n$—$CO_2R_3$ where n=1-6 and $R_3$ is an alkyl group; —$NHR_4$ where $R_4$ is H or alkyl or an amine protecting group such as t-Boc and Fmoc; —O—$(CH_2)_n$—$CH(ZR_5)_2$ where n is a number of 1-6, Z is O or S, $R_5$ is H or an alkyl group; Ar—CH=CH—CH=CH—$CO_2$— where Ar represents a moiety selected from the group consisting of phenyl, substituted phenyl, biphenyl, substituted biphenyl, polycyclic aryls, substituted polycyclic aryls, and heterocyclic aryls; —O—$(CH_2)_n$—CHO; —$O_2CCH_2CH_2CO_2R_6$, where $R_6$ is H or NHS which represents N-succinimidyl; and $CH_2$=CH—$CO_2$—. In a poly(ethylene glycol) derivative of the formula Y-Poly-X, the first functional group X and the second functional group Y are preferably different from each other, thus ensuring the polymer to be heterobifunctional.

Preferably, when X is Ar—CH=CH—CH=CH—$CO_2$— where Ar is as defined above, Y is —O—$(CH_2)_n$—CHO or —O—$(CH_2)_n$—$CH(ZR_5)_2$ where n is a number of 1-6, Z is O or S, and $R_5$ is H or an alkyl group. When X is —O—$(CH_2)_n$—$CH(ZR_5)_2$ where n is a number of 1-6, Z is O or S, and $R_5$ is H or an alkyl group, Y is preferably —$O_2CCH_2CH_2CO_2R_6$ where $R_6$ is H or NHS. When X is —O—$CH_2$—$CO_2CH(CH_3)CH_2CONHS$, the second functional group Y is preferably $CH_2$=CH—$CO_2$—.

Although the reaction scheme of method of the present invention is demonstrated above in the equations:

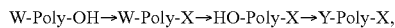

it should be understood that there can be more than one chemical reaction steps between any of two products in the equations. For example, several sequential reaction steps may take place to convert the terminal hydroxyl group of W-Poly-OH to the first functional group X. Likewise, several reaction steps may be performed to modify the new hydroxyl group of HO-Poly-X to produce the second functional group Y.

Further, in one embodiment of the invention, before the step of removing the removable group W, the polymer W-Poly-X can be linked to a macromolecule or surface through a linkage formed between the first reactive functional group X and a suitable moiety on the surface of the macromolecule, thus conjugating the W-Poly- portion of the polymer to the macromolecule: W-Poly-$M_1$ where $M_1$ is a macromolecule such as protein, peptide, lipid, drug, polysaccharide, or other polymers, or surface of a substance, e.g., microorganism. The removable group W in the conjugate W-Poly-$M_1$ is thereafter removed by mild chemical reactions such as, e.g., catalytic hydrogenolysis or by acid-catalyzed hydrolysis. The resultant —OH can be reacted directly to, e.g., another macromolecule $M_2$ such as protein, peptide, lipid, drug, polysaccharide, or other polymers, or surface of a substance, e.g., microorganism to form $M_2$-Poly-$M_1$. If conjugation to another macromolecule is not desired, the —OH group can be optionally converted to an inert non-reactive group, e.g., capped by alkylation. Alternatively, the resultant —OH group can be converted to a reactive functional group Y as described above: Y-Poly-$M_1$. The functional group Y can then be reacted with $M_2$ to form $M_2$-Poly-$M_1$.

   (1)

(X=reactive functional group)

   (2)

($M_1$=macromolecule, e.g., surface, drug, protein or polymer.)

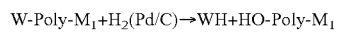

OR

   (3)

   (4)

   (5)

($M_2$=a macromolecule, e.g., surface, drug, protein, or polymer, or a different site on $M_1$.)

Hydrogels can be produced in this method through crosslinking of multiple different macromolecules by the PEG related polymer Poly. However, it should be understood that, in accordance with this invention, the two functional group X and Y can also be linked to the same macromolecule, wherein the conjugating of PEG related polymers on the macromolecule may form a polymer shell on the macromolecule.

In another embodiment of the invention, the heterobifunctional derivative of PEG or related polymer Y-Poly-X made as described above can be reacted with macromolecules or other substances through the functional groups X and Y and the reactive moieties on the macromolecules or other substances. For example, X and Y can be selected such that two different types of macromolecule or other substance can be linked to X and Y respectively. It is also possible to select X and Y such that they react with the same types of macromolecules.

In accordance with another aspect of the invention, heterobifunctional derivatives of poly(ethylene glycol) or related polymers are provided. Such polymers are represented by a formula of Y-Poly-X, where Poly represents poly(ethylene glycol) or related polymers as defined above. X and Y are reactive functional groups selected from the group consisting of mesylate, tosylate, tresylate, —O—$(CH_2)_n$—$CO_2H$ where n=1-6, —O—$(CH_2)_n$—$CO_2R_3$ where n=1-6 and $R_3$ is an alkyl group, —$NHR_4$ where $R_4$ is H or alkyl or an amine protecting group such as t-Boc and Fmoc, —O—$(CH_2)_n$—$CH(ZR_5)_2$ where n is a number of 1-6, and Z is O or S, $R_5$ is H or an alkyl group, Ar—CH=CH—CH=CH—$CO_2$—, where Ar represents a moiety selected from the group consisting of phenyl, substituted phenyl, biphenyl, substituted biphenyl, polycyclic aryls, substituted polycyclic aryls, and heterocyclic aryls, —O—$(CH_2)_n$—CHO, and —$O_2CCH_2CH_2CO_2R_6$, where $R_6$ is H or NHS, n is 1-6. Preferably X is different from Y.

In some embodiments, when X is Ar—CH=CH—CH=CH—$CO_2$— where Ar is as defined above, Y is —O—$(CH_2)_n$—CHO or —O—$(CH_2)_n$—$CH(ZR_5)_2$ where n is a number of 1-6, Z is O or S, and $R_5$ is H or an alkyl group; when X is —O—$(CH_2)_n$—$CH(ZR_5)_2$ where n is a number of 1-6, Z is O or S, and $R_5$ is H or an alkyl group, Y is preferably —$O_2CCH_2CH_2CO_2R_6$ where $R_6$ is H or NHS; when X is —O—$CH_2$—$CO_2CH(CH_3)CH_2CONHS$, the second functional group Y is preferably $CH_2$=CH—$CO_2$—.

In some embodiments Y-POLY-X is a polymer derivative comprising the following formula:

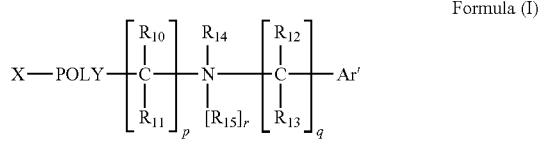

Formula (I)

wherein:

X is selected from the group consisting of: hydroxyl; mesylate; tosylate; tresylate; —O—$(CH_2)_n$—$CO_2H$ wherein (n) is a number of 1-6; —O—$(CH_2)_n$—$CO_2R_3$ wherein (n) is a number of 1-6 and $R_3$ is an alkyl group; —$NHR_4$ wherein $R_4$ is H or alkyl or an amine protecting group; —O—$(CH_2)_n$—$CH(ZR_5)_2$ wherein (n) is a number of 1-6, Z is O or S, and $R_5$ is H or an alkyl group; Ar—CH=CH—CH=CH—$CO_2$—, where Ar represents a moiety selected from the group consisting of phenyl, substituted phenyl, biphenyl, substituted biphenyl, polycyclic aryls, substituted polycyclic aryls, and heterocyclic aryls; —O—$(CH_2)_n$—CHO wherein (n) is a number of 1-6; and —$O_2CCH_2CH_2CO_2R_6$, wherein $R_6$ is H or N-succinimidyl;

POLY is a water-soluble and non-peptidic polymer;

(p) is zero or a number of 1-6 (i.e., 0, 1, 2, 3, 4, 5 or 6);

(q) is zero of a number of 1-6 (i.e., 0, 1, 2, 3, 4, 5 or 6);

(r) is either zero or one, with the understanding that if (r) is one, the polymer derivative has a positive charge;

each $R_{10}$, when present, is independently H or and alkyl group;

each $R_{11}$, when present, is independently H or and alkyl group;

each $R_{12}$, when present, is independently H or and alkyl group;

each $R_{13}$, when present, is independently H or and alkyl group;

$R_{14}$ is H or and alkyl group;

$R_{15}$, when present, is H or and alkyl group; and

Ar' is a moiety selected from the group consisting of phenyl, substituted phenyl, biphenyl, substituted biphenyl, polycyclic aryls, substituted polycyclic aryls, and heterocyclic aryls; —O—$(CH_2)_n$—CHO wherein (n) is a number of 1-6; and —$O_2CCH_2CH_2CO_2R_6$, wherein $R_6$ is H or N-succinimidyl.

With respect to polymer derivatives corresponding to Formula (I), a positive charge will be associated with the polymer when (r) is one as a result of the quaternary nitrogen. With respect to each of $R_{15}$ (when present) and $R_{14}$, it is preferred that these substituents are lower alkyl (methyl, ethyl and so forth). When the polymer derivative is in the charged form, it is possible for the polymer derivative to take the form of a salt. Counterions to complement the positively charged polymer derivative to provide the salt form include chloride, bromide and iodide, with the chloride salt form being preferred.

In some instances (q) will be 1 and each of $R_{12}$ and $R_{13}$ will be H, thereby providing a benzyl moiety when Ar' is phenyl. In some instances (p) will be zero, particularly when POLY is defined as —$CH_2CH_2$—O—$(CH_2CH_2O)_{n'}$—$CH_2CH_2$— and (n) is from about 8 to about 4000.

With respect to the X, it is preferred that X is hydroxyl and Ar' is phenyl.

A particularly preferred polymer derivative comprises the following structure:

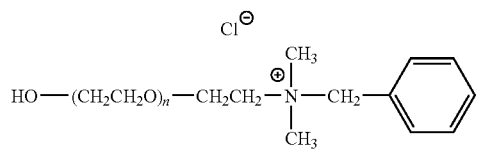

wherein (n) is from about 8 to about 4000.

The polymer derivatives of Formula (I) can exist in a solid form (typically when in the form of a salt) or liquid form (e.g., solution or suspension). The polymer derivatives can be useful as part of a composition. The composition can comprise both the polymer derivative as well as a macromolecule (preferably a therapeutic macromolecule useful in treating a patient suffering from a condition or disease). The composition (either with or without the macromolecule) can, for example, serve as a useful starting point for further synthetic steps, such as when preparing a pharmaceutical composition.

In yet another aspect of the invention, a method is provided for preparing a heterobifunctional derivative of poly(ethylene glycol) or related polymers having a formula of X-$Poly_a$-O—$CHR_5(CH_2)_nCO_2$-$Poly_b$-X, where $Poly_a$ and $Poly_b$ represent the same types of polymers represented by Poly as described above, n is 0-6, and $R_5$ is H or alkyl, X is a reactive functional group. Substantially pure form of the heterobifunctional derivatives can be produced in high purity and high yield without having to resort to a chromatography purification step.

In the method, a first polymer having a formula of Ar—$C(R_1)(R_2)O$-$Poly_b$-U and a second polymer of Ar—$C(R_1)(R_2)$O-$Poly_a$-$CHR_5(CH_2)_n$CO—V are provided where $R_1$ and $R_2$ are H, alkyl, or Ar where Ar is as defined above and is selected from the group consisting of phenyl, substituted phenyl, biphenyl, substituted biphenyl, polycyclic aryls, substituted polycyclic aryls, and heterocylicaryls, and where U and V are moieties so selected that the first polymer can react with the second polymer to form a polymer of Ar—$C(R_1)(R_2)$O-$Poly_a$-O—$CHR_5(CH_2)_nCO_2$—$Poly_b$-$OC(R_1)(R_2)$—Ar. As described above, the first polymer and the second polymer can be made by forming separately $Poly_b$ and $Poly_a$ directly onto an arylmethyloxide ion Ar—$C(R_1)(R_2)O^−$ to produce Ar—$C(R_1)(R_2)$O-$Poly_a$-OH or Ar—$C(R_1)(R_2)$O-$Poly_b$-OH, and optionally, subsequently modifying the terminal hydroxyl group to moieties U and V respectively, such that the two polymer can be linked in, e.g., an ester linkage. The linked polymer can then be modified by removing the Ar—C($R_1$)($R_2$)O— moieties by catalytic hydrogenolysis or by acide-catalyzed hydrolysis. The resultant —OH groups can optionally be converted into other reactive functional groups. Examples of the reactive functional group X include, but are not limited to, —OH; $CH_2$=$CR_5CO_2$— where $R_5$ is H or alkyl; —O—$(CH_2)_n$—$CH(ZR)_2$ where R is H or alkyl, Z is O or S and n is 1-6; NHS—$O_2CO$— where NHS represents N-succinimidyl. In a preferred embodiment, U is —OH and V is a halogen group such as —Cl.

In yet another aspect of the invention, a method is provided for preparing a bifunctional derivative of poly(ethylene glycol) or related polymers having a formula of $R_8$O-Poly$_a$-O—$CHR_5(CH_2)_nCO_2$-Poly$_b$-Y, where Poly$_a$, Poly$_b$, n, $R_5$ are as defined above, and $R_8$ is H or an alkyl group. Y is a reactive functional group. The method is free of a chromatography step. In the method, a first polymer of Ar—C($R_1$)($R_2$)O-Poly$_b$-U, is provided as described above. A second polymer of $R_8$O-Poly$_a$-$CHR_5(CH_2)_nCO$—V, is also provided where $R_8$ is H or alkyl, or Ar where Ar is defined as above. The moieties U and V can be reacted with each other to form, e.g., an ester linkage such that the first polymer can be linked with the second polymer to form the polymer of $R_8$O-Poly$_a$-O—$CHR_5(CH_2)_nCO_2$-Poly$_b$-OC($R_1$)($R_2$)—Ar. The Ar—C($R_1$)($R_2$)O— moiety can then be converted to a desirable functional group. Preferably, U is —OH, and V is a halogen group such as —Cl. Y can be a functional group such as —OH; $CH_2$=$CR_5CO_2$— where $R_5$ is H or alkyl; and —O—$(CH_2)_n$—$CH(ZR)_2$ where R is H or alkyl, Z is O or S and n is 1-6; and —O—$(CH_2)_n$—$CO_2H$ where n is 1-6.

In accordance with yet another aspect of the invention, a method is provided for making a polymer of $R_9$O-Poly-OH without contaminating the polymer with the reactivity of HO-Poly-OH. Poly is as defined above, and $R_9$ is an and alkyl or aryl group. As disclosed in the prior art, removing HO-Poly-OH such as HO-PEG-OH from a preparation of PEG derivatives normally requires extensive and laborious purification steps using, e.g., chromatography. The method of the present invention obviates this requirement. In the method, Ar—$CR_1R_2$O-Poly-OH is first synthesized by forming the polymer Poly onto the arylmethyloxide ion Ar—$CR_1R_2$O$^-$. The Ar—$CR_1R_2$O-Poly-OH is then alkylated to convert the polymers to Ar—$CR_1R_2$—O-PEG-O$R_9$. Any impurity of HO-Poly-OH is converted to $R_9$O-PEG-O$R_9$ upon alkylation. The next step is to convert the Ar—$CR_1R_2$—O— moiety into —OH by acid-catalyzed hydrolysis or hydrogenolysis and forming a new mixture of $R_9$O-PEG-OH and $R_9$O-PEG-O$R_9$. Since $R_9$O-PEG-O$R_9$ is inert in most chemical reactions, the mixture is chemically equivalent to pure $R_9$O-PEG-OH. Optionally, the $R_9$O-PEG-OH can be further converted to $R_9$O-PEG-CHO.

The following examples are given to illustrate the invention, but should not be considered limiting.

Example 1. Synthesis of HO-PEG-$NH_3^+Cl^-$
Example 2. Synthesis of HO-PEG-$OCH_2CO_2H$
Example 3. Synthesis of $Cl^-H_3N^+$-PEG-O—$CH_2CO_2H$
Example 4. Synthesis of $Cl^-H_3N^+$-PEG-O—$CH_2CH_2CO_2H$
Example 5. Synthesis of $C_6H_5$—CH=CH—CH=CH—$CO_2$PEG-$OCH_2CH(OC_2H_5)_2$
Example 6. Synthesis of NHS-$O_2$CO-PEG-$OCH_2CO_2$-PEG-O—$CO_2$NHS (NHS=N-succinimidyl)
Example 7. Synthesis of $CH_2$=CH—$CO_2$-PEG-$OCH_2CO_2$-PEG-$O_2C$—CH=$CH_2$
Example 8. Synthesis of $CH_3$O-PEG-O—$CH_2CH_2CO_2$-PEG-OH
Example 9. Synthesis of NHS-$O_2CCH_2CH_2$COO-PEG-$OCH_2CH_2CH(OC_2H_5)_2$
Example 10. Synthesis of $CH_2$=$CHCO_2$-PEG-$OCH_2CO_2$-PEG-OCH($CH_3$)$CH_2CO_2$NHS
Example 11. Alkylation: Preparation of $CH_3$O-PEG-OH absent HO-PEG-OH from a mixture of BzO-PEG-OH and HO-PEG-OH
Example 12. Synthesis of Benzyldimethylammonium-PEG-OH Example 1

Preparation of HO-PEG-$NH_3^+Cl^-$

Reactions:

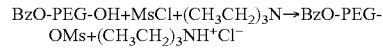
BzO-PEG-OH+MsCl+($CH_3CH_2$)$_3$N→BzO-PEG-OMs+($CH_3CH_2$)$_3$NH$^+$Cl$^-$

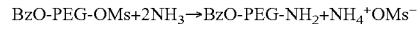
BzO-PEG-OMs+2$NH_3$→BzO-PEG-$NH_2$+$NH_4^+$OMs$^-$

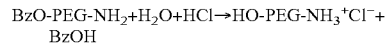
BzO-PEG-$NH_2$+$H_2$O+HCl→HO-PEG-$NH_3^+Cl^-$+BzOH a) Preparation of BzO-PEG-OMs: BzO-PEG-OH (MW=3400, 34 g, 10 mmole) in 150 ml of toluene was azeotropically distilled for 2 hours under nitrogen and the solution was cooled to room temperature. To the solution was added 40 ml of dry methylene chloride and 2.1 ml of dry triethylamine (15 mmole). The solution was cooled in an ice bath and 1.2 ml of dry mesyl chloride (15 mmole) was added dropwise. The solution was stirred at room temperature under nitrogen overnight and the reaction was quenched by adding 2 ml absolute ethanol. The mixture was evaporated under vacuum to remove solvents, primarily those other than toluene, filtered, concentrated again under vacuum, and then precipitated into 100 ml of ethyl ether. The product was collected by filtration and dried in vacuo. Yield 34 g (100%). $^1$H nmr (DMSO-$d_6$): δ 3.5 (br m, PEG), 4.31 (t, $OCH_2CH_2$OMs), \4.49 (s, $C_6H_5$—CH-OPEG-), 7.33 (s+complex mult., $C_6H_5$—$CH_2$-OPEG-).

b) Preparation of BzO-PEG-$NH_2$: BzO-PEG-OMs (25 g, 7.35 mmole) was dissolved in 500 ml of aqueous ammonia solution containing 5 g of ammonium chloride and the solution was stirred at room temperature for 72 hours. The solution was then extracted three times with methylene chloride. The organic phase was dried over sodium sulfate, filtered, condensed under vacuum, and the product precipitated with 100 ml of ethyl ether. The product was collected by filtration and dried in vacuo. Yield 23 g (92%). $^1$H nmr (DMSO-$d_6$): δ 3.5 (br m, PEG), 2.9 (t, —$CH_2NH_2$), 4.49 (s, $C_6H_5$—$CH_2$-OPEG-), 7.33 (s+complex mult., $C_6H_5$—$CH_2$-OPEG-).

c) Preparation of HO-PEG-$NH_3^+Cl^-$: A solution of BzO-PEG-$NH_2$ (46 g, 14 mmoles) in 200 ml of concentrated HCl (12 M) was stirred at room temperature for 44 h. It was then diluted to 1200 ml with water and NaCl was added to make a 15% solution. The aqueous solution was extracted three times with methylene chloride and the combined extracts were dried over sodium sulfate. The methylene chloride was concentrated under vacuum and the product precipitated by the addition of ether. The product was collected by filtration and dried under vacuum at room temperature. Yield: 42 g (95%). $^1$H nmr (DMSO-$d_6$): δ 2.96 (t, $CH_2$—N), 3.5 (br m, PEG), 4.6 (br, OH), 7.9 (br, $NH_3^+$).

Example 2

Preparation of HO-PEG-OCH$_2$CO$_2$H

Reactions:

BzO-PEG-OH+(CH$_3$)$_3$O$^-$K$^+$→BzO-PEG-O$^-$K$^+$+ (CH$_3$)$_3$OH

BzO-PEG-O$^-$K$^+$+Br—CH$_2$CO$_2$C(CH$_3$)$_3$→

→BzO-PEG-O—CH$_2$CO$_2$C(CH$_3$)$_3$+KBr

BzO-PEG-O—CH$_2$CO$_2$C(CH$_3$)$_3$+H$_2$O(H$^+$)→

→HO-PEG-O—CH$_2$CO$_2$H+BzOH+(CH$_3$)$_3$OH a) Preparation of BzO-PEG-OCH$_2$CO$_2$C(CH$_3$)$_3$: BzO-PEG-OH (MW=3400, 40 g, 11.7 mmole) was azeotropically dried with 250 ml toluene under N$_2$. After two hours, the solution was cooled to room temperature. Potassium tert-butoxide (2.8 g, 23.5 mmole) dissolved in 90 ml tert-butanol and 90 ml toluene was added to the above PEG solution. The mixture was stirred for two hours at room temperature. Tert-butyl bromoacetate (4 ml, 26.3 mmole) was added, and the solution was stirred under N$_2$ at room temperature overnight. The solution was filtered, condensed under vacuum, and precipitated into 300 ml of ether. The product was collected by filtration and dried under vacuum. $^1$H nmr (DMSO-d$_6$): δ 1.5 (s, t-Bu), 3.51 (m, PEG), 3.98 (s, —OC$\underline{H}_2$CO$_2$—), 4.49 (s, C$_6$H$_5$C$\underline{H}_2$O—), 7.33 (s+comp. mult., C$_6$$\underline{H}_5$CH$_2$O—).

b) Preparation of HO-PEG —OCH$_2$CO$_2$H: BzO-PEG-OCH$_2$CO$_2$C(CH$_3$)$_3$ (10 g) was dissolved in 100 ml of hydrochloric acid (37%), and the solution was stirred at room temperature for 48 hours. The solution was diluted with one liter of distilled water and the pH was adjusted to 2 with 1N sodium hydroxide solution. The solution was then extracted three times with methylene chloride. The organic phase was dried over anhydrous sodium sulfate, filtered to remove salt, condensed under vacuum, and precipitated into ether. The product was collected by filtration and dried under vacuum. Yield 8.5 g (85%). $^1$H nmr (DMSO-d$_6$): δ 3.51 (br m, PEG), 4.01 (s, -PEGOC$\underline{H}_2$COOH).

Example 3

Preparation of Cl H$_3$N+-PEG-O —CH$_2$CO$_2$H

HO-PEG-OCH$_2$CO$_2$H+CH$_3$OH(H$^+$)→HO-PEG-O—CH$_2$CO$_2$CH$_3$+H$_2$O

HO-PEG-O—CH$_2$CO$_2$CH$_3$+MsCl+(CH$_3$CH$_2$)$_3$N→

→MsO-PEG-O—H$_2$CO$_2$CH$_3$+(CH$_3$CH$_2$)$_3$NH$^+$Cl$^-$

MsO-PEG-O—CH$_2$CO$_2$CH$_3$+NH$_4$$^+$OH$^-$→

→H$_2$N-PEG-O—CH$_2$CO$_2$$^-$NH$_4$$^+$+CH$_3$OH

H$_2$N-PEG-O—CH$_2$CO$_2$$^-$NH$_4$$^+$+HCl→Cl$^-$H$_3$N$^+$-PEG-O—CH$_2$CO$_2$H a) Preparation of HO-PEG$_{3400}$-OCH$_2$CO$_2$CH$_3$. HO-PEG-OCH$_2$CO$_2$H (15 g) prepared as in Example 2 was dissolved in 75 ml of methanol and 3 ml of concentrated H$_2$SO$_4$ was added to the resulting solution. The solution was stirred at room temperature for 1.5 h and 180 ml of 5% aqueous NaHCO$_3$ was carefully added. Sodium chloride (25 g) was then added and the pH of the resulting solution was adjusted to 7.0 with 5% Na$_2$HPO$_4$. The solution was extracted with methylene chloride and the combined organic phases were dried over Na$_2$SO$_4$. The methylene chloride solution was then evaporated to 20 ml and the product precipitated with 300 ml of cold ethyl ether. The product was collected by filtration and dried under vacuum at room temperature to obtain 13.5 g of product which was shown to be 100% pure by GPC.

b) Preparation of MsO-PEG-OCH$_2$CO$_2$CH$_3$: HO-PEG$_{3400}$-OCH$_2$CO$_2$CH$_3$ (13.5 g) was dissolved in 400 ml of CHCl$_3$ and about 200 ml of solvent was distilled. The residual solution was cooled to room temperature and triethylamine (0.72 ml) was added, followed by 0.38 ml of MsCl. The reaction mixture was stirred overnight under N$_2$ at room temperature, 2 ml of ethanol was added, and the resulting mixture was stirred 15 minutes. After evaporating the solvent under vacuum (55 EC bath), 300 ml of cold ethyl ether was added and the resulting precipitate was collected by filtration and dried under vacuum at room temperature. The yield was 14 g and the $^1$H nmr spectrum indicated 100% mesylation.

c) Preparation of H$_2$N-PEG$_{3400}$-CO$_2$$^-$NH$_4$$^\pm$: MsO—OCH$_2$CO$_2$CH$_3$ (13 g) was dissolved in 70 ml of H$_2$O and the pH was adjusted to 12. After stirring for 1.5 h while maintaining the pH at 12, 250 of NH$_4$0H solution containing 5% NH$_4$Cl was added. The reaction mixture was then stirred for about 40 h NaCl was added to bring its concentration to about 8%. The resulting solution was extracted with CH$_2$Cl$_2$ and dried over Na$_2$SO$_4$. The CH$_2$Cl$_2$ phase was evaporated to about 20 ml and precipitated with about 300 ml of cold ethyl ether. The precipitated product was collected by filtration and dried under vacuum at room temperature. The yield was 12.5 g. The purity was 97% by $^1$H nmr and 95% pure by GPC.

d) Preparation of Cl$^-$H$_3$N$^+$-PEG$_{3400}$-O—CH$_2$CO$_2$H: H$_2$N-PEG-CO$_2$$^-$NH$_4$$^+$ was dissolved on H$_2$O (50 ml) containing 15% NaCl. The pH was adjusted to 3.0 with 1 N HCl and the resulting solution was extracted with CH$_2$Cl$_2$. The CH$_2$Cl$_2$ extract was dried over Na$_2$SO$_4$, evaporated to about 20 ml and the product precipitated with about 300 ml of ethyl ether and dried under vacuum at room temperature. The purity was 95% by $^1$H NMR.

Example 4

Preparation of Cl$^-$H$_3$N$^+$-PEG-O—CH$_2$CH$_2$CO$_2$H

BzO-PEG-OH+CH$_2$=CH—CN→BzO-PEG-O—CH$_2$CH$_2$CN

BzO-PEG-O—CH$_2$CH$_2$CN+H$_2$O/H$^+$→HO-PEG-O—CH$_2$CH$_2$CONH$_2$

HO-PEG-O—CH$_2$CH$_2$CONH$_2$+KOH/H$_2$O→HO-PEG-O—CH$_2$CH$_2$CO$_2$H

HO-PEG-O—CH$_2$CH$_2$CO$_2$H+CH$_3$OH/H$^+$→HO-PEG-O—CH$_2$CH$_2$CO$_2$CH$_3$

HO-PEG-O—CH$_2$CH$_2$CO$_2$CH$_3$+MsCl+(CH$_3$CH$_2$)$_3$N→

→MsO-PEG-O—CH$_2$CH$_2$CO$_2$CH$_3$+(CH$_3$CH$_2$)$_3$NH$^+$Cl

MsO-PEG-O—CH$_2$CH$_2$CO$_2$CH$_3$+NaOH/H$_2$O→

→MsO-PEG-O—CH$_2$CH$_2$CO$_2$$^-$Na$^+$

MsO-PEG-O—CH$_2$CH$_2$CO$_2$Na+NH$_4$OH→H$_2$N-PEG-O—CH$_2$CH$_2$CO$_2$$^-$NH$_4$$^+$

H$_2$N-PEG-O—CH$_2$CH$_2$CO$_2$$^-$NH$_4$$^+$+HCl→Cl$^-$$^+$H$_3$N-PEG-O—CH$_2$CH$_2$CO$_2$H a) Preparation of HO-PEG$_{3400}$-O—CH$_2$CH$_2$CO$_2$H. BzO-PEG-OH (100 g) was dissolved in 100 ml of H$_2$O, 5 ml of 40% aqueous KOH was added to the resulting solution and the mixture stirred for 1 h. The solution was then cooled to 0 EC and 50 ml of acrylonitrile was added under argon. After stirring 3 h, 1 l of 20% NaCl in H$_2$O was added and the pH adjusted to 7.0 with 10% NaH$_2$PO$_4$. The solution was then extracted with CH$_2$Cl$_2$ and the extract dried over Na$_2$SO$_4$. After evaporating the solvent under vacuum, the residue was dissolved in 500 ml of concentrated HCl and stirred at room temperature for 60 h. The solution was then added to a solution of 240 g of NaOH in 1.2 l of H$_2$O, NaCl was added to make an 8% solution, and the pH was adjusted to 7.0. The solution was extracted with CH$_2$Cl$_2$ and the extract was dried over Na$_2$SO$_4$ and evaporated to dryness under vacuum. The residue was stirred 20 h in 1.5 l of 8% KOH, then 180 ml of concentrated HCl and NaCl (8%) was added. The pH was adjusted to 3.0 and the product extracted with methylene chloride. The extract was dried over Na$_2$SO$_4$, evaporated, and the product precipitated with ethyl ether. The product was collected by filtration and dried under vacuum to obtain 90 g containing 91% of HO-PEG-O—CH$_2$CH$_2$CO$_2$H by GPC.

b) Preparation of Cl$^-$$^+$H$_3$N-PEG-O—CH$_2$CH$_2$CO$_2$H: HO-PEG-O—CH$_2$CH$_2$CO$_2$H was converted to Cl$^-$$^+$H$_3$N-PEG-O—CH$_2$CH$_2$CO$_2$H by the same procedure as described for conversion of HO-PEG-OCH$_2$CO$_2$H to Cl$^-$H$_3$N$^+$-PEG$_{3400}$-O—CH$_2$CO$_2$H in Example 3.

Example 5

Preparation of C$_6$H$_5$—CH=CH—CH=CH—CO$_2$PEG-OCH$_2$CH(OC$_2$H$_5$)$_2$

Reactions:

BzO-PEG-OH+ClCH$_2$CH(OC$_2$H$_5$)$_2$+NaOH→BzO-PEG-OCH$_2$CH(OC$_2$H$_5$)$_2$+NaCl

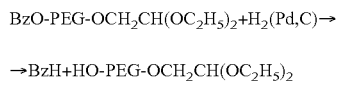
BzO-PEG-OCH$_2$CH(OC$_2$H$_5$)$_2$+H$_2$(Pd,C)→

→BzH+HO-PEG-OCH$_2$CH(OC$_2$H$_5$)$_2$

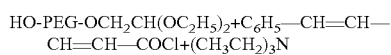
HO-PEG-OCH$_2$CH(OC$_2$H$_5$)$_2$+C$_6$H$_5$—CH=CH—CH=CH—COCl+(CH$_3$CH$_2$)$_3$N

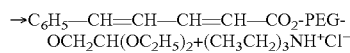
→C$_6$H$_5$—CH=CH—CH=CH—CO$_2$-PEG-OCH$_2$CH(OC$_2$H$_5$)$_2$+(CH$_3$CH$_2$)$_3$NH$^+$Cl$^-$ a) Preparation of BzO-PEG-O—CH$_2$CH(OC$_2$H$_5$)$_2$: In a 3-necked, 500 ml round-bottom flask were placed 300 ml of dioxane and 14 g of BzO-PEG-OH (MW=3400, 0.0040 moles). The resulting solution was then azeotropically dried by distillation under N$_2$ of 130 ml of solvent. After cooling the solution, finely powdered NaOH (0.8 g, 0.02 moles) and ClCH$_2$CH(OC$_2$H$_5$)$_2$ (3 ml, 0.02 moles) were added under N$_2$ and the resulting suspension was rapidly stirred while refluxing over a 24 h period. Thirty ml of dioxane was then removed by distillation and the rapidly stirred solution was refluxed under N$_2$ for an additional 24 h. The suspension was then cooled and filtered with the addition of Celite®. The filtrate was evaporated under vacuum and 200 ml of ethyl ether was added to the residual oil. The resulting precipitate was collected by filtration and dried under vacuum at room temperature to obtain a tan powder (13.6 g). The powder was dissolved in CH$_2$Cl$_2$ (35 ml) and reprecipitated by the addition of 500 ml of cold ethyl ether. The precipitate was collected by filtration and dried under vacuum at room temperature to obtain 13.0 g of BzO-PEG-OCH$_2$CH(OC$_2$H$_5$)$_2$ as a white powder (purity 94-98% by $^1$H nmr). $^1$H nmr (DMSO-d$_6$): δ 1.11 (t, OCH$_2$CH$_3$); 3.51 (br m, O—CH$_2$CH$_2$—O), 4.48 (s, C$_6$H$_5$—CH$_2$O$^-$); 4.55 (t, —CH(OC$_2$H$_5$)$_2$), 7.32 (s, C$_6$H$_5$—)

b) Preparation of HO-PEG-O CH$_2$CH(OC$_2$H$_5$)$_2$: BzO-PEG-OCH$_2$CH(OC$_2$H$_5$)$_2$ (13 g) was dissolved in 150 ml of 95% ethanol and 6.5 g of 10% Pd on charcoal was added under N$_2$. The suspension was shaken 70 h under H$_2$ (40 psi) and the suspension filtered. The residual catalyst was washed with 2×25 ml of boiling chloroform and the washings combined with the ethanol filtrate and evaporated under vacuum to obtain a clear, colorless oil. To the oil was added 400 ml of cold ethyl ether and the resulting precipitate collected by filtration to obtain, after vacuum drying at room temperature, 11.3 g of HO-PEG-OCH$_2$CH(OC$_2$H$_5$)$_2$ as a white powder (92% pure by $^1$H nmr). $^1$H nmr (DMSO-d$_6$): δ 1.10, (t, OCH$_2$CH$_3$), 3.51 (br m, O—CH$_2$CH$_2$—O), 4.55, (m, HO+—CH(OCH$_2$CH$_3$)$_2$)

c) Preparation of C$_6$H$_5$—CH=CH—CH=CH—CO$_2$PEG-OCH$_2$CH(O$_{C2}$H$_5$)$_2$: A solution of cinnamylideneacetic acid (1.7 g, 0.01 moles) and thionyl chloride (3 ml, 0.04 moles) in 50 ml of hexane were refluxed under N$_2$ for 4 h, then filtered to remove a small amount of dark solid and the filtrate evaporated under vacuum. The residue was dried under vacuum overnight at room temperature to obtain 1.5 g of cinnamylideneacetyl chloride as a yellow solid, m.p. 51-52° C.)

A solution of HO-PEG-O CH$_2$CH(OC$_2$H$_5$)$_2$ (3.4 g, mmole) in toluene (50 ml) was azeotropically distilled under nitrogen for 2 h to remove traces of water, then cooled to room temperature. Triethylamine was distilled from KOH under nitrogen and 0.28 ml (2 mmoles) of the fresh distillate was injected under nitrogen into the solution of HO-PEG-O CH$_2$CH(OC$_2$H$_5$)$_2$ in toluene. To the resulting solution was added cinnamylidene acetyl chloride (C$_6$H$_5$CH=CH—CH=CHCOCl) dropwise under nitrogen at room temperature with rapid stirring. Stirring was allowed to continue for three days under the same conditions and the white precipitate was removed by filtration. The filtrate was evaporated to 20 ml under vacuum and 300 ml of cold ether was added. The pale yellow precipitate was collected by filtration and dried under vacuum to obtain 3.4 g of pale yellow powder. The powder was dissolved in methylene chloride and extracted once with 50 ml of aqueous saturated sodium chloride and once with water. The organic phase was dried over sodium sulfate, evaporated to 25 ml, and 300 ml of cold ether was added with swirling. The resulting precipitate was collected by filtration and dried under vacuum at room temperature to obtain 3.05 g (86%) of C$_6$H$_5$—CH=CH—CH=CH—CO$_2$PEG-OCH$_2$CH(OC$_2$H$_5$)$_2$ as a pale yellow powder. $^1$H nmr (DMSO-d$_6$): δ 1.11 ppm (t, CH$_3$CH$_2$O—, 3.51 ppm (m, PEG-O—CH$_2$CH$_2$—O+CH$_3$CH$_2$O—); 4.20 ppm (t, —CH$_2$O$_2$C—), 4.52 ppm (t, —CH(OC$_2$H$_5$)$_2$) 6.11 (d, =CH, 7.57-7.12 (comp. mult., C$_6$H$_5$—+=CH) Purity by nmr: 89-96%.

Example 6

Preparation of NHS—O$_2$CO-PEG-OCH$_2$CO$_2$-PEG-O—CO$_2$NHS

NHS=Nsuccinimidyl

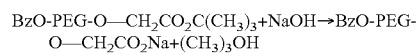
BzO-PEG-O—CH$_2$CO$_2$C(CH$_3$)$_3$+NaOH→BzO-PEG-O—CH$_2$CO$_2$Na+(CH$_3$)$_3$OH

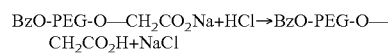
BzO-PEG-O—CH$_2$CO$_2$Na+HCl→BzO-PEG-O—CH$_2$CO$_2$H+NaCl

BzO-PEG-OCH$_2$CO$_2$H+SOCl$_2$→BzO-PEG-O—
CH$_2$COCl+SO$_2$+HCl

BzO-PEG-OCH$_2$COCl+BzO-PEG-OH+(CH$_3$CH$_2$)$_3$N→

BzO-PEG-OCH$_2$CO$_2$PEGOBz+(CH$_3$CH$_2$)$_3$NH$^+$Cl$^-$

BzO-PEG-OCH$_2$CO$_2$PEGOBz+H$_2$(Pd,C)→

→HO-PEG-OCH$_2$CO$_2$PEGOH+2BzH

HO-PEG-OCH$_2$CO$_2$PEGOH+NHS—OCO$_2$—NHS+
pyridine→

→NHS—O$_2$CO-PEG-OCH$_2$CO$_2$-PEG-O—CO$_2$NHS

Reactions:

a) Preparation of BzO-PEG-OCH$_2$CO$_2$H: BzO-PEG-OCH$_2$CO$_2$C(CH$_3$)$_3$ (20 g) was dissolved in distilled water and the pH adjusted to 12.0 with 1N NaOH solution. The solution was kept at pH 12.0 for two hours by continuous addition of NaOH solution and the solution was stirred overnight. The pH of the solution was adjusted to 2.5 by addition of 1N HCl solution and the solution was extracted three times with methylene chloride. The combined organic methylene chloride phases were dried over anhydrous sodium sulfate, filtered, and the filtrate condensed under vacuum before precipitating the product with ethyl ether. The product was collected by filtration and dried under vacuum at room temperature. Yield 18 g (90%). $^1$H nmr (DMSO-d$_6$): δ 3.5 (br m, PEG), 4.01 (s, -PEGOC$\underline{H}_2$COOH), 4.49 (s, C$_6$H$_5$—C$\underline{H}_2$-OPEG-), 7.33 (s+com, C$_6$$\underline{H}_5$—CH$_2$-OPEG-).

b) Preparation of BzO-PEG-OCH$_2$CO$_2$-PEG-OBz: In a 100 ml round-bottom flask, BzO-PEG-OCH$_2$CO$_2$H (MW=3400, 3.4 g, 1 mmol) in toluene was dried by azeotropic distillation. A solution of thionyl chloride (2M, 4 ml, 8 mmole) in methylene chloride was injected and the mixture was stirred under N$_2$ overnight. The solvent was condensed by rotary evaporation and the syrup was dried in vacuo for about four hours over P$_2$O$_5$ powder. To the residue was added 5 ml of anhydrous methylene chloride and azeotropically dried BzO-PEG-OH (MW=3400, 2.55 g, 0.75 mmol) in toluene (20 ml). After the BzO-PEG-OCH$_2$COCl was dissolved, freshly distilled triethylamine (0.6 ml) was added and the mixture was stirred overnight. The triethylamine salt was removed by filtration and the product collected by precipitation with ethyl ether. It was further purified by dissolving in water and extracting with methylene chloride. Gel permeation chromatography of the product showed that 100% of BzO-PEG-OH had been converted to the ester. The mixture was then chromatographed on an ion-exchange column (DEAE sepharose fast flow, Pharmacia) to remove the BzO-PEG-OCH$_2$CO$_2$H and pure BzO-PEG-OCH$_2$CO$_2$-PEG-OBz was obtained. Yield: 4.1 gram (80%). $^1$H nmr (DMSO-d$_6$): δ 3.5 (br m, PEG), 4.14 (s, -PEGOC$\underline{H}_2$COOPEG-), 4.18 (t, -PEGO-CH$_2$COOC$\underline{H}_2$CH$_2$OPEG-),), 4.48 (s, Ar—C$\underline{H}_2$O) 7.32 (s, C$_6$$\underline{H}_5$—)

c) Preparation of HO-PEG-OCH$_2$CO$_2$-PEG-OH: A solution of BzO-PEG-OCH$_2$CO$_2$-PEG-OBz (MW=6800, 2 g, 0.59 mmole) in 1,4-dioxane (20 ml) was hydrogenolyzed with H$_2$ (2 atm) and 1 gram Pd/C (10%) overnight. The catalyst was removed by filtration and the product precipitated into ethyl ether after most of the solvent was removed on a rotary evaporator. Pure HO-PEG-OCH$_2$CO$_2$-PEG-OH was collected by filtration and dried under vacuum at room temperature to yield: 1.5 g (75%) of HO-PEG-OCH$_2$CO$_2$-PEG-OH. $^1$H nmr (DMSO-d$_6$): δ 3.5 (br m, PEG), 4.14 (s, -PEGOC$\underline{H}_2$COOPEG-), 4.18 (t, -PEGO-CH$_2$COOC$\underline{H}_2$CH$_2$OPEG-).

d) Preparation of NHS—O$_2$CO-PEG-OCH$_2$CO$_2$-PEG-O—CO$_2$NHS: HO-PEG-OCH$_2$CO$_2$-PEG-OH (2 g, 0.29 mmole) was azeotropically distilled with 100 ml acetonitrile and then slowly cooled to room temperature. To the resulting solution were added disuccinimidyl carbonate (621 mg, 1.17 mmole) and pyridine (0.3 ml), and the solution was stirred at room temperature overnight. The solvent was then removed under vacuum and 35 ml of dry methylene chloride was added to the residue. The insoluble solid was removed by filtration and the filtrate was washed with pH 4.5 sodium chloride saturated acetate buffer. The organic phase was dried over anhydrous sodium sulfate, and the solvent removed under vacuum. Ethyl ether was added and the precipitate was collected by filtration and dried under vacuum. Yield: 1.8 g (90%). $^1$H nmr (DMSO-d$_6$): δ 3.5 (br m, PEG), 4.14 (s, -PEGOC$\underline{H}_2$COOPEG-), 4.18 (t, -PEGOCH$_2$COOC$\underline{H}_2$CH$_2$OPEG-), 4.45 (t, -PEGOCH$_2$C$\underline{H}_2$OCONHS), 2.81 (s, NHS)

Example 7

Preparation of CH$_2$=CH—CO$_2$-PEG-OCH$_2$CO$_2$-PEG-O$_2$C—C—CH=CH$_2$

HO-PEG-OCH$_2$CO$_2$PEGOH+CH$_2$=CH—COCl+
(CH$_3$CH$_2$)$_3$N→

CH$_2$=CH—CO$_2$-PEG-OCH$_2$CO$_2$-PEG-O$_2$C—
CH=CH$_2$+(CH$_3$CH$_2$)$_3$NH$^+$Cl

Preparation of CH$_2$=CH—CO$_2$-PEG-OCH$_2$CO$_3$-PEG-O$_2$C—CH=CH$_2$: HO-PEG-OCH$_2$CO$_2$-PEG-OH (M.W.=6800, 1.5 g, 0.44 mmole end group) was azeotropically dried with 100 ml of toluene for two hours. The solution was cooled to room temperature under N$_2$ and 25 ml of methylene chloride and triethylamine (TEA, 0.56 mmole) was added. The solution was cooled in an ice bath and acryloyl chloride (1.5 mmole) in CH$_2$Cl$_2$ was added dropwise to the solution. After addition of acryloyl chloride, the ice bath was removed and the solution was stirred at room temperature overnight. One ml of ethanol was added to consume excess acryloyl chloride and the methylene chloride was then condensed under vacuum. The salt was removed by filtration, and the remaining solution precipitated into 100 ml of ether. The product was collected by filtration and dried in vacuo. The product was dissolved in 50 ml of chloroform and sodium carbonate (1.3 g) was added. The mixture was stirred vigorously at room temperature overnight. The salt was removed by filtration and the solvent was removed under vacuum. The residue was dissolved in 5 ml of methylene chloride and the solution added to 100 ml of ethyl ether. The resulting precipitate was collected by filtration and washed with 20 ml of 2 propanol and then with 40 ml of ether. The product was finally dried in vacuo. Yield: 1.35 g (90%). $^1$H nmr (DMSO-d$_6$): δ 3. dissolved in 5 ml methylene chloride and then precipitated into 100 ml of ethyl ether. The product was collected by filtration, washed with 20 ml of 2-propanol and then 40 ml ether. 5 (br m, PEG), 4.14 (t, -PEGOC$\underline{H}_2$COOPEG-), 4.18 (t, -PEGOCH$_2$COOC$\underline{H}_2$CH$_2$OPEG-), 4.21 (t, CH$_2$=CH—COO—C$\underline{H}_2$CH$_2$—O-PEG-, 4H), 5.85-6.45 (m, C$\underline{H}_2$=C$\underline{H}$COOPEG-).

Example 8

Preparation of CH₃O-PEG-O—CH₂CH₂CO₂-PEG-OH

Reactions:

CH₃O-PEG-OCH₂CH₂CO₂H+SOCl₂→

→CH₃O-PEG-OCH₂CH₂COCl+SO₂+HCl

CH₃O-PEG-OCH₂CH₂COCl+BzO-PEG-OH+(CH₃CH₂)₃N→

→CH₃O-PEG-OCH₂CH₂CO₂PEG-O-Bz+(CH₃CH₂)₃NH⁺Cl⁻

CH₃O-PEG-OCH₂CH₂CO₂PEG-O-Bz+H₂(Pd,C)→

→CH₃O-PEG-OCH₂CH₂CO₂PEGOH a) Preparation of CH₃O-PEG-OCH₂CH₂CO₂-PEG-OBz: In a 100 ml round-bottom flask, a solution of CH₃O-PEG-OCH₂CH₂CO₂H (MW=2000, 2 g, 1 mmole) was dissolved in toluene and azeotropically dried for two hours. After slowly cooling to room temperature, the solution was added to thionyl chloride (3 ml, 6 mmole) in methylene chloride and then stirred under N₂ overnight. The solvent was then removed by rotary evaporation and the residual syrup was dried in vacuo for about four hours over P₂O₅ powder. To the solid was added 5 ml of anhydrous methylene chloride and a solution (20 ml) of azeotropically dried BzO-PEG-OH (MW=3400, 2.04 g, 0.60 mmol) in toluene. To the resulting solution was added 0.6 ml of freshly distilled triethylamine and the solution was stirred overnight. The triethylamine salt was removed by filtration and the crude product was precipitated with ethyl ether and collected by filtration. The mixture was then purified by ion-exchange chromatography (DEAE sepharose fast flow column, Pharmacia). Pure CH₃O-PEG-OCH₂CH₂CO₂-PEG-OBz was obtained. Yield: 2.6 g (80%). ¹H nmr (DMSO-d₆): δ 3.5 (br. mult., PEG), 3.24 (s, CH₃OPEG-), 4.48 (s, -PEGOCH₂C₆H₅), 7.33 (s÷comp. mult., -PEGOCH₂C₆H₅), 2.55 (t, —OCH₂CH₂CO₂PEG-), 4.13 (t, -PEG-CO₂CH₂CH₂O-PEG)

b) Preparation of CH₃O-PEG-OCH₂CH₂CO₂-PEG-OH: A solution of 2 g of CH₃O-PEG-OCH₂CH₂CO₂-PEG-OBz in 1,4-dioxane was hydrogenolyzed with H₂ (2 atm) on 1 gram Pd/C (10%) overnight. The catalyst was removed by filtration, the solvent was condensed under vacuum and the solution was added to ethyl ether. The product was collected by filtration and dried under vacuum at room temperature to yield: 1.5 g (75%) of CH₃O-PEG-OCH₂CH₂CO₂-PEG-OH. ¹H nmr (DMSO-d₆): δ 3.5 (br. mult. PEG), 3.24 (s, CH₃OPEG-), 2.55 (t, OCH₂CH₂CO₂PEG-), 4.13 (t, -PEG-CO₂CH₂CH₂O-PEG)

Example 9

Preparation of NHS—O₂CCH₂CH₂COO-PEG-OCH₂CH₂CH(OC₂H₅)₂

Reactions:

BzO-PEG-OH+MsCl+(H₅C₂)₃N→BzO-PEG-OMs+(H₅C₂)₃N⁺Cl⁻

BzO-PEG-OMs+NaH+HOCH₂CH₂CH(OC₂H₅)₂→

→BzO-PEG-OCH₂CH₂CH(OC₂H₅)₂

BzO-PEG-OCH₂CH₂CH(OC₂H₅)₂+H₂(Pd,C)→

→BzH+HO-PEG-OCH₂CH₂CH(OC₂H₅)₂

HO-PEG-OCH₂CH₂CH(OC₂H₅)₂+succinic anhydride+pyridine→

→HO₂CCH₂CH₂CO₂-PEG-OCH₂CH₂CH(OC₂H₅)₂

HO₂CCH₂CH₂CO₂-PEG-OCH₂CH₂CH(OC₂H₅)₂+DCC+NHS→

→NHS—O₂CCH₂CH₂CO₂-PEG-OCH₂CH₂CH(OC₂H₅)₂ a) Preparation of BzO-PEG-OMs: BzO-PEG-OH (MW=3400, 25 g, 7.35 mmol) in 150 ml of toluene was azeotropically distilled for 1 hour under nitrogen and the solution was cooled to room temperature. To the solution was added 20 ml of dry methylene chloride, 1.14 ml of dry triethylamine (8.16 mmol) and 0.61 ml of dry mesyl chloride (7.86 mmol) dropwise. The solution was stirred at room temperature under nitrogen overnight and the reaction was quenched by adding 5 ml absolute ethanol. The mixture was concentrated under vacuum, filtered, concentrated again under vacuum and precipitated into ethyl ether. The product was collected by filtration and dried in vacuo. Yield 23 g (100%). ¹H nmr (DMSO-d₆): δ 3.5 (br m, PEG), 4.31 (t, OCH₂CH₂OMs), 4.49 (s, C₆H₅—CH₂—O-PEG-), 7.33 (s+comp m., C₆H₅—CH₂—O-PEG-).

b) Preparation of BzO-PEG-OCH₂CH₂CH(OC₂H₅)₂: A solution of 3,3-diethoxypropanol (9.806 g, 66.2 mmol) was azeotropically distilled in 90 ml of toluene for 1 hour under nitrogen. After cooling to room temperature the solution was added to a dispersion of sodium hydride (60% in mineral oil, 2.75 g, 68.7 mmol) in 50 ml of anhydrous toluene. The solution was mixed for 2 h under mild heating at 35 EC and then filtered. The filtrate was added to an azeotropically distilled solution of BzOPEG-OMs (23 g, 6.76 mmol) in 150 ml toluene. The mixture was stirred for 20 hours at 125 EC under a nitrogen atmosphere. The mixture was concentrated under vacuum and the residue was dissolved in 80 ml of methylene chloride. The solution was filtered and the product was precipitated with 1 liter of cold isopropyl alcohol. The product was collected by filtration and dried in vacuo. The powder was dissolved in 100 ml of deionized water and extracted three times with 200 ml methylene chloride. The mixture was concentrated under vacuum, filtered and precipitated into ethyl ether. The product was collected by filtration and dried in vacuo. Yield 19 g (100%). ¹H nmr (DMSO-d₆): δ 1.10 (t, —CH(OCH₂CH₃)₂, 1.73 (q, —OCH₂CH₂—CH), 3.5 (br m, PEG), 4.49 (s, C₆H₅—CH₂-OPEG-), 4.56 (m, —CH(OCH₂CH₃)₂), 7.33 (s+comp m, C₆H₅—CH₂—O-PEG-).

c) Preparation of HO-PEG-OCH₂CH₂CH(OC₂H₅)₂: BzO-PEG-OCH₂CH₂CH(OC₂H₅)₂ (10 g, 2.94 mmol) was dissolved in 100 ml of 96% ethanol and 5.0 g of 10% Pd on charcoal was added under nitrogen. The suspension was shaken 48 h under H₂ (40 psi) and the suspension filtered. The residual catalyst was washed with methylene chloride. The product in the combined filtrate of methylene chloride and ethanol was concentrated under vacuum and filtered. The viscous solution was precipitated into cold ethyl ether, and the product recovered by filtration and dried in vacuo. Yield 15 g. ¹H nmr (DMSO-d₆): δ 1.10 (t, —CH(OCH₂CH₃)₂, 1.72 (q, —OCH₂CH₂—CH). 3.5 (br m, PEG), 4.55 (m, —CH(OCH₂CH₃)₂).

d) Preparation of HO₂CCH₂CH₂CO₂-PEG-OCH₂CH₂CH(OCH₂CH₃)₂: HO-PEG-OCH₂CH₂CH(OC₂H₅)₂ (3 g, 0.88 mmol) and BHT (5 mg) were dissolved in 20 ml of anhydrous toluene and azeotropically distilled at 120 EC for 1 hour under nitrogen. After cooling the solution to 75 EC, pyridine (0.36 ml) and succinic anhydride (0.353 g) were added and stirred at 75 EC for 24 hours. The solution was concentrated under vacuum, filtered and precipitated into cold ethyl ether. The precipitate was recovered by filtration and dried in vacuo. The powder was reconstituted in 50 ml deionized water and 1M sodium hydroxide was added dropwise to maintain a constant pH of 7.2 for 1 hour. 1N HCl was quickly added dropwise to obtain a pH of 3.0 and immediately extracted 3 times into 100 ml methylene chloride. The product in the organic phase was dried over sodium sulfate, concentrated under vacuum, precipitated into cold ethyl ether, recovered by filtration and dried in vacuo. Yield 2.0 g (88%). $^1$H nmr (DMSO-d$_6$): δ 1.10 (t, CH(OCH$_2$CH$_3$)$_2$, 1.72 (q, —OCH$_2$CH$_2$—CH), 3.5 (br m, PEG), 4.12 (t, —CO$_2$CH$_2$—), 4.55 (t, —CH(OCH$_2$CH$_3$)$_2$).

e) Preparation of NHS—O$_2$CCH$_2$CH$_2$CO$_2$-PEG-OCH$_2$CH$_2$CH(OCH$_2$CH$_3$)$_2$: HO$_2$CCH$_2$CH$_2$CO$_2$-PEG-OCH$_2$CH$_2$CH(OCH$_2$CH$_3$)$_2$ (2.0 g, 0.56 mmol) was dissolved in 20 ml anhydrous methylene chloride under a nitrogen atmosphere. N-hydroxysuccinimide (105 mg, 0.91 mmol) was first added to the solution and then dicyclohexylcarbodiimide (174 mg, 0.84 mmol) was added. The solution was stirred overnight at room temperature under nitrogen atmosphere. The product was concentrated under vacuum, filtered, precipitated into cold ethyl ether, recovered by filtration and dried in vacuo. Yield 1.5 g (99%). $^1$H nmr (DMSO-d$_6$): δ 1.10 (t, —CH(OCH$_2$CH$_3$)$_2$, 1.72 (q, —OCH$_2$CH$_2$—CH), 2.80 (s, NHS), 3.5 (br m, PEG), 4.12 (t, —CO$_2$CH$_2$—), 4.55 (t, —CH(OCH$_2$CH$_3$)$_2$).

Example 10

Preparation of CH$_2$═CHCO$_2$-PEG-OCH$_2$CO$_2$CH(CH$_3$)CH$_2$CO$_2$NHS

Reactions:

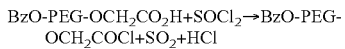

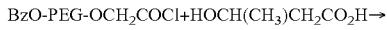

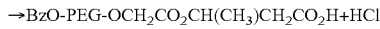

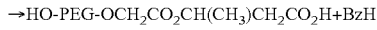

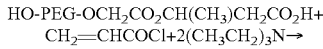

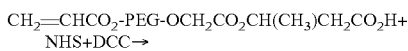

a) Preparation of BzO-PEG-OCH$_2$CO$_2$—CH(CH$_3$)CH$_2$CO$_2$H: BzO-PEG-OCH$_2$CO$_2$H (MW=3400, 15 g, 4.4 mmole) was azeotropically dried with 60 ml of toluene under N$_2$. After two hours, the solution was slowly cooled to room temperature. To this solution was added thionyl chloride (18 ml, 36 mmole). The resulting solution was stirred overnight, the solvent condensed by rotary evaporation, and the syrup dried in vacuo for about four hours over P$_2$O$_5$ powder. 3-hydroxybutyric acid (1.45 g, 13.5 mmole) was azeotropically dried with 70 ml of 1,4-dioxane, and then added to the dried BzO-PEG-OCH$_2$COCl. After the PEG acyl chloride had dissolved, 4.5 ml of dry triethylamine was injected into the system and the solution was stirred overnight. The salt was removed by filtration and the filtrate was condensed on a rotary evaporator at 55 EC and dried in vacuo. The crude product was then dissolved in 100 ml of distilled water and the pH of the solution was adjusted to 3.0. The aqueous phase was extracted three times with a total of 80 ml of methylene chloride. The organic phase was dried over sodium sulfate, filtered, condensed on a rotary evaporator, and precipitated into 100 ml of ethyl ether. The product was collected by filtration and dried in vacua at room temperature. Yield 14 g (93%). $^1$H nmr (DMSO-d$_6$): δ 3.5 (br m, PEG), 2.58 (d, -PEGCOOCH(CH$_3$)CH$_2$COOH), 5.14 (h, -PEG-COOCH(CH$_3$)CH$_2$COOH), 1.21 (d, -PEGCOOCH(CH$_3$)CH$_2$COOH), 4.055 (s, PEGOCH$_2$COO), 4.49 (s, C$_6$H$_5$—CH$_2$-OPEG-), 7.33 (s+comp. mult., C$_6$H$_5$CH$_2$-OPEG-).

b) Preparation of HO-PEG-OCH$_2$CO$_2$—CH(CH$_3$)CH$_2$CO$_2$H: A solution of BzO-PEG-OCH$_2$CO$_2$— OCH(CH$_3$)CH$_2$CO$_2$H (8 g) in benzene (50 ml) was hydrogenolyzed with H$_2$ (2 atm) on 4 gram Pd/C (10%) at room temperature for 48 hours. The catalyst was removed by filtration, the solvent was condensed, and the solution was precipitated into ethyl ether. The product was collected by filtration and dried in vacua at room temperature. Yield: 6.6 gram (83%). $^1$H nmr (DMSO-d$_6$): δ 3.5 (br m, PEG), 2.51 (d, -PEGCO$_2$CH(CH$_3$)CH$_2$CO$_2$H), 5.16 (h, -PEG-CO$_2$CH(CH$_3$)CH$_2$CO$_2$H), 1.22 (ds PEG-CO$_2$CH(CH$_3$)CH$_2$CO$_2$H), 4.06 (s, -PEGOCHCO$_2$CH(CH$_3$)— c) Preparation of CH$_2$═CHCO$_2$-PEG-OCH$_2$CO$_2$—CH(CH$_3$)CH$_2$CO$_2$H: HO-PEG-OCH$_2$CO$_2$CH(CH$_3$)CH$_2$CO$_2$H (3 g, 0.88 mmole) was azeotropically distilled with 40 ml of toluene under N$_2$ until approximately 15 ml of solution remained. The solution was then cooled to room temperature under N$_2$ and 25 ml of methylene chloride and triethylamine (1.5 mmole) were added. The solution was cooled in an ice bath and acryloyl chloride (2 mmole) were added dropwise. After addition of acryloyl chloride, the ice bath was removed and the solution was stirred at room temperature overnight. The methylene chloride was then partially removed under vacuum, the salt was removed by filtration, and the filtrate added to 100 ml of ether. The precipitated product was collected by filtration and dried in vacuo. The product was then dissolved in sodium acetate buffer (0.1M, pH 5.5), stirred for half an hour, and extracted three times with methylene chloride. The organic phase was dried over sodium sulfate, filtered, condensed, and precipitated in 100 ml of ethyl ether. The precipitate was collected by filtration and dried in vacuo at room temperature. Yield 2.4 g (80%). $^1$H nmr (DMSO-d$_6$): δ 3.5 (br m, PEG), 2.51 (d, CH$_2$CO$_2$H), 5.16 (h, —CH(CH$_3$—), 1.22 (d, —CH(CH$_3$)—), 4.06 (s, -PEGOCH$_2$CO$_2$PEG-), 4.21 (t, —CO$_2$CH$_2$CH$_2$O—), 5.85-6.45 (m, CH$_2$═CH—).

d) Preparation of CH$_2$═CHCO$_2$-PEG-OCH$_2$CO$_2$—CH(CH$_3$)CH$_2$CO$_2$NHS: CH$_2$═CH—CO$_2$-PEG-OCH$_2$CO$_2$CH(CH$_3$)CH$_2$CO$_2$H (1.4 g, approx. 0.4 mmole) and N-hydroxysuccinimide (51 mg, 0.43 mmole) was dissolved in 30 ml of dry methylene chloride. To this solution was added dicyclohexylcarbodiimide (95 mg, 0.45 mmole) in 5 ml of dry methylene chloride. The solution was stirred under nitrogen overnight and the solvent removed by rotary evaporation. The resulting syrup was dissolved in 10 ml of dry toluene and the insoluble solid was removed by filtration. The filtrate was added to 100 ml of dry ethyl ether and the precipitated product was collected by filtration and dried in vacuo at room temperature. Yield 0.94 g (94%). $^1$H nmr (DMSO-$d_6$): δ 3.5 (br m, PEG), 3.0-3.2 (m, -PEGCOO—CH($CH_3$)$C\underline{H}_2$COONHS), 5.26 (h, PEGCOOC$\underline{H}$($CH_3$)$CH_2$COONHS), 1.3 (d, -PEG-COOCH($C\underline{H}_3$)$CH_2$COONHS), 4.10 (s, -PEGO$C\underline{H}_2$COO (CM)), 2.81 (s, NHS), 4.21 (t, $CH_2$=CH—COO—C$\underline{H}_2CH_2$—O-PEG-, 4H), 5.85-6.45 (m, C$\underline{H}_2$=CHCOOPEG-).

Example 11

Method for Preparing $CH_3$O-PEG-OH and Containing NO HO-PEG-OH from a Mixture of BzO-PEG-OH and HO-PEG-OH Overview of Synthesis:
Step 1

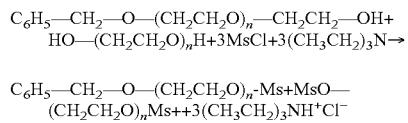

Step 2

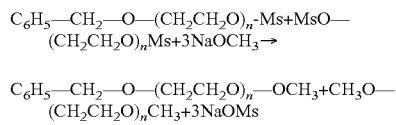

Alternate Synthesis
Step 1

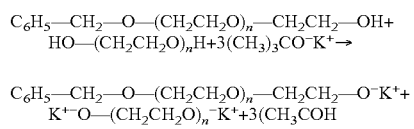

Step 2

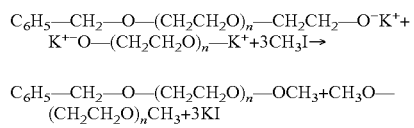

Step 3—Composition from Either Route is Hydrogenolyzed

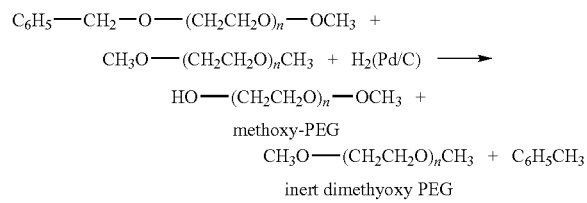

a) Preparation of BzO-PEG-OMs: BzO-PEG-OH (MW=5000, 50 g, 10 mmoles) containing 6% by weight of HO-PEG-OH was dissolved in toluene and the solution was azeotropically dried for 2 h under nitrogen and cooled to room temperature. To this solution was added 50 ml of anhydrous methylene chloride and 2.1 ml of anhydrous triethylamine (15 mmoles). The resulting solution was cooled in an ice bath and 1.2 ml of mesyl chloride (15 mmoles) was added dropwise. The solution was then stirred at room temperature overnight and the reaction was quenched by adding 2 ml of absolute ethanol. The mixture was then concentrated under reduced pressure to remove 100 ml of solvents, filtered, and added to 800 ml of cold ether. The precipitated product was collected by filtration and dried under reduced pressure. Yield: 48.3 g (96.6%). $^1$H nmr (DMSO-$d_6$): δ 3.5 (br m, PEG), 4.31 (t, $OCH_2C\underline{H}_2OMs$), 4.49 (s, $C_6H_5$—C$\underline{H}_2$-OPEG-), 7.33 (s+complex mult., $C_6\underline{H}_5$—$CH_2$-OPEG).

b) Preparation of BzO-PEG-$OCH_3$: BzO-PEG-OMs containing 6% by weight of MsO-PEG-OMs (MW=5078, 45 g, 8.86 mmoles) in 250 ml of toluene was azeotropically dried for 2 h. To the resulting solution was added a 25 wt % solution of sodium methoxide (11.5 g, 53.2 mmoles, 6-fold excess) in methanol and the resulting solution was heated at 120-122 EC for 20 h under nitrogen. The resulting solution was then cooled to room temperature, 2 ml of water was added, and the mixture stirred 15 minutes. The mixture was then concentrated under reduced pressure to remove 100 ml of solvent, filtered, and the filtrate added to 700 ml of cold ether. The precipitated product was collected by filtration and dried under reduced pressure. Yield: 42.8 g. $^1$H nmr (DMSO-$d_6$): δ 3.24 (s, PEG), 3.51 (br. mult., PEG), 4.49 (s, $C_6H_5$—C$\underline{H}_2$-OPEG-), 7.33 (s+comp. mult., $C_6\underline{H}_5$—$CH_2$-OPEG-).

c) Preparation of BzO-PEG-$OCH_3$ from BzO-PEG-OH: BzO-PEG-OH containing 6 wt % of HO-PEG-OH (MW=10,000, 50 g, 5.0 moles) in 250 ml of toluene was azeotropically distilled for 2 h under nitrogen and the solution was cooled to room temperature. Potassium tert-butoxide (1.0 M solution in tert-butanol, 25 ml, 25 mmoles) was added and the mixture was stirred 15 minutes. Methyl iodide (7.1 g, 50 mmoles) was then added and the mixture was stirred 20 h at room temperature under nitrogen in the dark. The solvents were removed under reduce pressure and the residue was dissolved in 100 ml of methylene chloride and added to 800 ml of cold ether. The precipitated product was collected by filtration and dried under reduced pressure. (Yield: 46.8 g) $^1$H nmr (DMSO-$d_6$): δ 3.24 (s, $CH_3$O-PEG), 3.51 (br. mult., PEG), 4.49 (s, $C_6H_5$—$CH_2$-OPEG-), 7.33 (s+comp. mult., $C_6\underline{H}_5$—$CH_2$-OPEG-).

d) Preparation of $CH_3$OPEG-OH containing no detectable amounts of HO-PEG-OH: BzO-PEG-$OCH_3$ containing 6 wt % of $CH_3$0-PEG-$OCH_3$ (40 g, MW=10,000, mmoles) was dissolved in 400 ml of ethanol and 4 g of Pd on activated carbon (10% Pd) was added. The mixture was hydrogenated (800 psi) at room temperature. The mixture was then filtered and the solvent removed under vacuum. Yield: 37.1 g. $^1$H nmr (DMSO-$d_6$): δ (s, $\underline{CH}_3$O-PEG), 3.51 (br. mult., PEG), 4.58 (t, OH)

Example 12

Synthesis of Benzyldimethylammonium-PEG-2K—OH

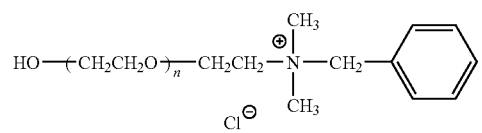

A. Preparation of Benzyl-PEG-Mesylate, $CH_3$—$S(O)_2O$—$(CH_2CH_2O)_{2K}$—$CH_2$—$C_6H_5$.

Benzyl-PEG-OH (175 g, 91.3 mmol) was dissolved in (1.2 L) toluene and azeotropically dried. The solution was then cooled under an inert atmosphere followed by addition of 23 mL of triethylamine. The resulting solution was stirred for several minutes followed by dropwise addition 10.6 mL of methanesulfonyl chloride. The reaction mixture was then stirred for 3 hours at room temperature and the progress of the reaction monitored by $^1$H NMR. To the reaction mixture was then added 75 g of sodium carbonate, followed by stirring for 1 hour. The reaction mixture was then filtered through Celite, and the solvent removed by rotary evaporation. To the crude product was added 1.25 L of 2-propanol, and the flask warmed in a water bath until the product was fully dissolved. The solution was then cooled to room temperature under an inert atmosphere with constant stirring, followed by addition of 1.2 L of diethyl ether to precipitate the product. The precipitate mixture was stirred for at least 30 minutes in an ice bath, and the product collected by filtration. The isolated product was washed with 2-propanol. $^1$H NMR (CDCl$_3$): —OS(O)$_2$CH$_3$, 3.1 ppm (s); —CH$_2$—OS(O)$_2$CH$_3$, 4.3 ppm (t).

B. Debenzylation of Benzyl-PEG-Mesylate to form HO-PEG-Mesylate, CH$_3$—S(O)$_2$O—(CH$_2$CH$_2$O)H$_{2K}$ To a round-bottom flask was added 153.9 g benzyl-PEG-2K-mesylate (from step A. above) and 14 g of Pd(OH)$_2$ in cyclohexene (90 ml). The mixture was refluxed for 2 hours. Upon completion, the reaction mixture was cooled to 45-50° C. and filtered through a Celite pad. The Celite pad was washed with additional hot ethanol, and the filtrate then concentrated by rotary evaporation. To the concentrated crude product was added 1.5 L of 2-propanol. The flask was warmed in a water bath until the product was fully dissolved. The solution was then cooled to room temperature under an inert atmosphere with stirring, followed by addition of 1.5 L of diethyl ether to precipitate the product. The product mixture was stirred for an additional 30 minutes in an ice bath, and the product collected by filtration. Formation of the product was confirmed by $^1$H NMR (DMSO-d$_6$) absence of benzyl peaks at 7.1 ppm and 4.5 ppm.

C. Formation of Benzyldimethylammonium PEG-OH-2K, C$_6$H$_5$—CH$_2$—N(CH$_3$)$_2$$^+$—CH$_2$CH$_2$(OCH$_2$CH$_2$)$_{2K}$—OH.

To a round bottom flask was added HO-PEG$_{2K}$ mesylate from step B. above (90 g) and benzyldimethylamine (247 ml) and the resulting solution stirred for 72 hours at 60° C. The reaction solution was then poured into 1.25 L of 2-propanol with stirring, followed by addition of 500 L of diethyl ether to precipitate the product. The mixture was then stirred for an additional 30 minutes, and the product collected by filtration and further washed with diethyl ether. The recovered product was then dried under vacuum. The dried crude product (90 g) was then dissolved in 1M HCl (2 L), followed by addition of a 10% w/v solution of aqueous NaCl (200 g). The resulting solution was then added to a separatory funnel and extracted three times with diclorometane (400 ml, 200 ml, 200 ml). The combined organic extracts were then dried over anhydrous sodium sulfate, the drying agent removed by filtration, and the solvent removed by rotary evaporation. Yield: 73 g (81%). $^1$H NMR (DMSO-d$_6$): —N$^+$(CH$_3$)$_2$—, 6H, 3.00 ppm (s), —C$_6$H$_5$, 5H, 7.5 ppm (mult).

The invention has been described in particular exemplified embodiments. However, the foregoing description is not intended to limit the invention to the exemplified embodiments, and the skilled artisan should recognize that variations can be made within the scope and spirit of the invention as described in the foregoing specification. On the contrary, the invention includes all alternatives, modifications, and equivalents that may be included within the true spirit and scope of the invention as defined by the appended claims.

That which is claimed is:

1. A method comprising (a) increasing the pH of an aqueous composition comprising —CH$_2$CH$_2$O(CH$_2$CH$_2$O)$_n$CH$_2$CH$_2$— bearing a —O—(CH$_2$)$_n$—CO$_2$R$_3$ functional group and a benzyloxy group, and wherein the molecular weight of the —CH$_2$CH$_2$O(CH$_2$CH$_2$O)$_n$CH$_2$CH$_2$— is between 3400 and 176000, and (b) subsequently adjusting the pH of the aqueous composition with an acid to result in an aqueous composition comprising —CH$_2$CH$_2$O(CH$_2$CH$_2$O)$_n$CH$_2$CH$_2$— bearing a —O—(CH$_2$)$_n$—CO$_2$H functional group and a benzyloxy group, and further wherein R$_3$ is tert-butyl, (n) in each instance of —O—(CH$_2$)$_n$—CO$_2$R$_3$ and —O—(CH$_2$)$_n$—CO$_2$H is 1-6, and the molecular weight of the —CH$_2$CH$_2$O(CH$_2$CH$_2$O)$_n$CH$_2$CH$_2$— is between 3400 and 176000.

2. The method of claim 1, wherein each instance of (n) in —O—(CH$_2$)$_n$—CO$_2$R$_3$ and —O—(CH$_2$)$_n$—CO$_2$H is 1.

3. The method of claim 1, wherein said increasing the pH is achieved by combining a NaOH solution with the aqueous composition comprising the —CH$_2$CH$_2$O(CH$_2$CH$_2$O)$_n$CH$_2$CH$_2$— bearing a —O—(CH$_2$)$_n$—CO$_2$R$_3$ functional group.

4. The method of claim 3, wherein each instance of (n) in —O—(CH$_2$)$_n$—CO$_2$R$_3$ and —O—(CH$_2$)$_n$—CO$_2$H is 1.

5. The method of claim 1, wherein the —CH$_2$CH$_2$O(CH$_2$CH$_2$O)$_n$CH$_2$CH— has a molecular weight of between 3400 and 10000.

6. The method of claim 1, wherein the aqueous composition comprising —CH$_2$CH$_2$O(CH$_2$CH$_2$O)$_n$CH$_2$CH$_2$— bearing a —O—(CH$_2$)$_n$—CO$_2$R$_3$ functional group is in the form of a solution.

7. The method of claim 1, wherein the aqueous composition comprising —CH$_2$CH$_2$O(CH$_2$CH$_2$O)$_n$CH$_2$CH$_2$— bearing a —O—(CH$_2$)$_n$—CO$_2$H functional group is in the form of a solution.

8. The method of claim 1, wherein the aqueous composition comprising —CH$_2$CH$_2$O(CH$_2$CH$_2$O)$_n$CH$_2$CH$_2$— bearing a —O—(CH$_2$)$_n$—CO$_2$R$_3$ functional group is in the form of a solution and the aqueous composition —CH$_2$CH$_2$O(CH$_2$CH$_2$O)$_n$CH$_2$CH$_2$— bearing a —O—(CH$_2$)$_n$—CO$_2$H functional group is in the form of a solution.

* * * * *